United States Patent
Laroche et al.

(10) Patent No.: US 10,104,378 B2
(45) Date of Patent: Oct. 16, 2018

(54) RESIDUAL COLOUR TRANSFORM SIGNALLED AT SEQUENCE LEVEL FOR SPECIFIC CODING MODES

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 14/874,066

(22) Filed: Oct. 2, 2015

(65) Prior Publication Data

US 2016/0100175 A1    Apr. 7, 2016

(30) Foreign Application Priority Data

Oct. 6, 2014 (GB) .................................. 1417650.7

(51) Int. Cl.
| | |
|---|---|
| *H04N 19/186* | (2014.01) |
| *H04N 19/147* | (2014.01) |
| *H04N 19/176* | (2014.01) |
| *H04N 19/60* | (2014.01) |
| *H04N 19/182* | (2014.01) |
| *H04N 19/103* | (2014.01) |
| *H04N 19/192* | (2014.01) |

(52) U.S. Cl.
CPC ......... *H04N 19/147* (2014.11); *H04N 19/103* (2014.11); *H04N 19/176* (2014.11); *H04N 19/182* (2014.11); *H04N 19/186* (2014.11); *H04N 19/192* (2014.11); *H04N 19/60* (2014.11)

(58) Field of Classification Search
CPC .. H04N 19/186; H04N 19/176; H04N 19/182; H04N 19/147; H04N 19/60
See application file for complete search history.

(56) References Cited

U.S. PATENT DOCUMENTS

| | | | |
|---|---|---|---|
| 2005/0259730 A1* | 11/2005 | Sun ...................... | H04N 11/042 |
| | | | 375/240.03 |
| 2008/0043840 A1* | 2/2008 | Song .................... | H04N 19/593 |
| | | | 375/240.11 |

(Continued)

FOREIGN PATENT DOCUMENTS

WO    2006009400 A1    1/2006

*Primary Examiner* — Shawn S An
(74) *Attorney, Agent, or Firm* — Canon USA, Inc. I.P. Division

(57) ABSTRACT

The present invention is related to video coding and decoding, in particular HEVC RExt that define the adaptive residual color transform, Adaptive RCT, of a residue of pixels. Compared to HEVC RExt where Adaptive RCT is signalled at Coding Unit level, embodiments of the invention propose to signal it in the bitstream in association with two or more coding units forming the image. In other words, it is signalled at a level higher than the CU level, for instance at sequence or frame or slice or tile or coding tree block level. In addition, various flags at this higher level make it possible to generically define the applying or not of RCT for various respective coding modes, for instance Inter coding mode, Intra Block Copy coding mode or Intra coding mode where Chroma and Luma modes are the same. Such approach makes it possible to reduce the amount of evaluations to be performed.

11 Claims, 14 Drawing Sheets

(56) References Cited

U.S. PATENT DOCUMENTS

| | | | |
|---|---|---|---|
| 2009/0168894 A1* | 7/2009 | Marpe | H04N 9/67 375/240.24 |
| 2015/0264374 A1* | 9/2015 | Xiu | H04N 19/176 375/240.25 |
| 2016/0105657 A1* | 4/2016 | Zhang | H04N 19/136 375/240.12 |

* cited by examiner

RESIDUAL COLOUR TRANSFORM SIGNALLED AT SEQUENCE LEVEL FOR SPECIFIC CODING MODES

This application claims the benefit under 35 U.S.C. § 119(a)-(d) of United Kingdom Patent Application No. 1417650.7, filed on Oct. 6, 2014 and entitled "Residual colour transform signalled at sequence level for specific coding modes". The above cited patent application is incorporated herein by reference in its entirety."

FIELD OF THE INVENTION

The present invention is related to video coding and decoding. More precisely, embodiments of the present invention concern the adaptive residual colour transform (Adaptive RCT) presented in the scope of the Range Extension of the High Efficiency Video Coding (HEVC: ISO/IEC 23008-2 MPEG-H Part 2/ITU-T H.265) international standard.

BACKGROUND OF THE INVENTION

When encoding an image in a video sequence, the image is recursively split, thus creating a plurality of splitting levels. For instance, the image is first divided into slices (or tiles), each slice forming a data structure that can be decoded independently from other slices of the same image, in terms of entropy coding, signal prediction, and residual signal reconstruction. This division defines a slice level.

Then, each slice may be divided into coding entities of pixels of equal size referred to as Coding Tree Block (CTB), thus defining a CTB level. The size of a Coding Tree Block is typically 64 by 64 pixels.

Each Coding Tree Block may then be broken down into a hierarchical tree of smaller blocks which size may vary and which are the actual blocks of pixels to encode. These smaller blocks to encode are referred to as Coding Unit (CU), thus defining a CU level.

The encoding of a particular Coding Unit is typically predictive. This means that a predictor block is first determined. Next, the difference between the predictor block and the Coding Unit is calculated. This difference is called the residue or residual block. Next, this residue is compressed. Usually, the compression of the residue includes a DCT transform followed by a quantization. The Range Extension of HEVC provides other tools, for instance implicit RDPCM, explicit RDPCM, Residual Rotation, Transform Skip, Transform and Quantization bypass, Rice Parameter Adaptation, Cross-Component Decorrelation and Adaptive Residual Colour Transform.

In practice, the prediction is operated on one or more Prediction Units (PUs) that split the Coding Unit. To be noted that the Coding Unit is the basic unit for which a prediction mode is selected or defined. It means that the PU or PUs forming the CU are all predicted using the prediction mode selected for the whole CU.

The actual encoded information of the Coding Unit is made of some information to indicate the way of determining the predictor block and the compressed residue. Best predictor blocks are blocks as similar as possible to the PUs in order to get a small residue that could be efficiently compressed.

The coding mode is defined based on the method used to determine the predictor block for the predictive encoding method of a Coding Unit.

A first main prediction-based coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

Conventional INTRA coding defines a plurality of modes: planar mode, DC mode and 32 directional modes (including a horizontal mode and a vertical mode).

Variations of the INTRA coding have been progressively introduced in HEVC. For instance, Intra Block Copy (IBC) coding is proposed to use a block predictor from the causal area of the current image being reconstructed. Also, the Palette mode has been defined which does not require a residue to be transmitted to the decoder.

A second main prediction-based coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

Variations of the INTER coding have been introduced in HEVC. In particular, the Merge mode consists to predict the whole motion information to reduce the transmitted data. In Merge mode, a single predictor index is transmitted in addition to the compressed residue, predictor index from which the decoder is able to reconstruct the motion information. Another variation of INTER coding is the Skip Merge mode in which no residue is transmitted in the bitstream.

To find the best coding mode for a current Coding Unit being encoded, each coding mode is evaluated, often plenty of times since a plurality of "options" may be activated or not, in particular the tools provided by the Range Extension of HEVC.

As introduced above, the Adaptive Residual Colour Transform is one of these tools. In short, the Residual Colour Transform (RCT) consists to convert colour pixel components of the residue from a colour space to another colour space. The current version of HEVC for "screen contents" provides a RGB-to-YCoCg colour transform for the residues. This tool is very efficient to decorrelate RGB signal, thus offering Co and Cg residues with very few values (thus improving coding rate).

Note that "screen content" opposes to natural sequences in video sequences. The "screen content" video sequences refer to particular video sequences which have a very specific content corresponding to those captured from a personal computer of any other device containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The Residual Colour Transform is said to be "Adaptive" because the decision to apply it or not to the Coding Units is taken at Coding Unit level. It means that a corresponding flag, known as cu_residual_act_flag in the current version of HEVC, is provided in the bitstream for each Coding Unit, when the video sequence enables RCT.

The inventors have noticed that the Adaptive Residual Colour Transform is not useful for all the prediction-based coding modes. In addition, it has been observed that determining the value of the cu_residual_act_flag is quite costly at the encoder side. Also, at the decoder side, the presence of the Adaptive RCT increases the decoding complexity since it forms one of the numerous cascaded tools implemented for residual decoding.

The present invention seeks to overcome one or more of the foregoing drawbacks.

SUMMARY OF THE INVENTION

Embodiments of the invention at the decoder are directed to a method of decoding an image formed of a plurality of coding units of pixels in a video sequence, a coding unit being the basic unit for which a prediction mode is selected, the method comprising:

obtaining, from a bitstream, a residual block of pixels for at least part (e.g. a PU) of a current coding unit;

adding the residual block of pixels to a predictor block of pixels to obtain a corresponding decoded part of the current coding unit;

wherein, depending on a residual colour transform, RCT, flag signalled in the bitstream, applying or not a residual colour transform to the residual block of pixels before the step of adding, the residual colour transform converting colour pixel components of the residual block from a colour space to another colour space.

In embodiments, the RCT flag signalled in the bitstream is associated with two or more coding units forming the image.

In other embodiments, at least one coding unit comprises one or more transform units and the residual colour transform, RCT, flag is signalled in the bitstream at a transform unit level.

Similarly, embodiments of the invention at the encoder are directed to a method of coding an image formed of a plurality of coding units of pixels in a video sequence, a coding unit being the basic unit for which a prediction mode is selected, the method comprising:

obtaining a residual block of pixels for at least part of a current coding unit using a predictor block of pixels;

determining whether to apply or not a residual colour transform to the obtained residual block of pixels before encoding it into a bitstream, the residual colour transform converting colour pixel components of the residual block from a colour space to another colour space;

signalling the result of the determining using a residual colour transform, RCT, flag in the bitstream.

In embodiments, the RCT flag signalled in the bitstream is associated with two or more coding units forming the image.

Thanks to the use of a single RCT flag (equivalent to the conventional cu_residual_act_flag) for a plurality of CUs (i.e. at a level higher than the CU level), the process at the encoder as well as the decoder (parsing a corresponding syntax for each CU is no longer required) is simplified. In addition, lesser bits are needed in the bitstream.

In other embodiments, determining whether to apply or not the residual colour transform comprises taking into account a best current coding mode in deciding whether to perform an evaluation of the residual colour transform or not for the obtained residual block of pixels.

Correspondingly, a decoding device for decoding an image formed of a plurality of coding units of pixels in a video sequence, a coding unit being the basic unit for which a prediction mode is selected, the decoding device comprising at least one microprocessor configured for carrying out the steps of:

obtaining, from a bitstream, a residual block of pixels for at least part of a current coding unit;

adding the residual block of pixels to a predictor block of pixels to obtain a corresponding decoded part of the current coding unit;

wherein, depending on a residual colour transform, RCT, flag signalled in the bitstream, applying or not a residual colour transform to the residual block of pixels before the step of adding, the residual colour transform converting colour pixel components of the residual block from a colour space to another colour space.

In embodiments, the RCT flag signalled in the bitstream is associated with two or more coding units forming the image.

In other embodiments, at least one coding unit comprises one or more transform units and the residual colour transform, RCT, flag is signalled in the bitstream at a transform unit level.

Similarly, an encoding device for coding an image formed of a plurality of coding units of pixels in a video sequence, a coding unit being the basic unit for which a prediction mode is selected, the encoding device comprising at least one microprocessor configured for carrying out the steps of:

obtaining a residual block of pixels for at least part of a current coding unit using a predictor block of pixels;

determining whether to apply or not a residual colour transform to the obtained residual block of pixels before encoding it into a bitstream, the residual colour transform converting colour pixel components of the residual block from a colour space to another colour space;

signalling the result of the determining using a residual colour transform, RCT, flag in the bitstream.

In embodiments, the RCT flag signalled in the bitstream is associated with two or more coding units forming the image.

In other embodiments, determining whether to apply or not the residual colour transform comprises taking into account a best current coding mode in deciding whether to perform an evaluation of the residual colour transform or not for the obtained residual block of pixels.

Optional features of these embodiments are defined in appended claims. Some of these features are explained here below with reference to a method, and can be transposed into system features dedicated to a device according to embodiments of the invention.

In some embodiments, determining whether to apply or not a residual colour transform includes:

performing a first evaluation loop including enabling or disabling the residual colour transform for the first evaluation loop depending on a colour type of the image and coding the residual block of pixels using the residual colour transform if enabled, to obtain a first rate-distortion cost;

evaluating whether or not the obtained first rate-distortion cost is lower than a reference best rate-distortion cost;

performing a second evaluation loop only in case of positive evaluation, the second evaluation loop including enabling or disabling the residual colour transform for the second evaluation loop depending on a colour type of the image and coding the residual block of pixels using the residual colour transform if enabled, to obtain a second rate-distortion cost; and comparing the obtained rate-distortion cost or costs to the reference best rate-distortion cost to determine a best coding mode for coding the residual block of pixels.

In specific embodiments, the residual colour transform, RCT, flag is signalled in the bitstream at a transform unit level made of transform units, at least one coding unit comprising one or more transform units.

In other specific embodiments, the first and second evaluation loops code the residual block of pixels using the same coding parameters and an inverse enablement of the residual colour transform.

In yet other specific embodiments, the colour type of the image is a colour space in which the image is defined.

In yet other specific embodiments, the evaluation is negative when the reference best rate-distortion cost is associated with a reference coding mode having no residual block of pixels for the same part of the current coding unit.

In some embodiments, the RCT flag associated with two or more coding units is defined for coding units coded using at least one specific prediction-based coding mode. In other words, the RCT flag makes it possible to activate or deactivate the adaptive residual colour transform for some (prediction-based coding) modes, in particular for those modes the inventors have detected RCT is not useful. Preferably, one flag is associated with a given one of the specific coding modes, to be used to enable or disable RCT for this particular coding mode.

Regarding these particular modes, embodiments provide that the at least one specific prediction-based coding mode includes one or more of an Inter prediction coding mode, an Intra Block Copy coding mode and an Intra coding mode where Chroma and Luma modes are the same.

Additional embodiments provide that another residual colour transform flag is defined at coding unit level for coding units coded using another prediction-based coding mode, for instance Intra coding with different modes between Chroma and Luma components, or any of the three modes defined above (Inter, IBC and Intra with same Chroma and Luma modes) as soon as it is not implemented as a "specific prediction-based coding mode" for a RCT flag signalled at higher level in the sequence. This provision makes it possible to keep compliance with the current HEVC version for some coding modes.

In some embodiments, the RCT flag is signalled at a sequence level or a frame level or a slice or tile level or a coding tree block level where a coding tree block includes a plurality of coding units forming the image. The elementary image region in each of these levels encompasses a plurality of Coding Units evaluated for prediction.

In embodiments, the RCT flag is signalled in the bitstream in addition to a residual_adaptive_colour_transform_enabled, RACTE, flag, the RACTE flag being signalled at a sequence level and enabling RCT flags to be defined at a lower level in the sequence. This RACTE flag is defined in the current version of HEVC. It makes it possible for the decoder to know whether a cu_residual_act_flag is provided at CU level and thus must be parsed and decoded.

In other embodiments, the RCT flag takes a first value to indicate that no residual colour transform is to be applied to the two or more coding units, takes a second value to indicate that the residual colour transform is to be applied to the two or more coding units, and takes a third value to indicate that applying or not the residual colour transform is adaptively defined at coding unit level using an additional flag provided for each coding unit of the two or more coding units. This configuration makes it possible to still use the adaptive RCT as currently defined in HEVC, while keeping compatibility with the present invention.

In other embodiments, the RCT flag is enabled, i.e. indicates to apply the residual colour transform, where the image is defined in a Red-Green-Blue color space. This is because the RCT efficiently decorrelates RGB signals.

In embodiments, the RCT flag is disabled, i.e. indicates not to apply the residual colour transform, where the image is defined in a YUV color space. This is because the colour components in the residue are statistically well decorrelated in YUV signals.

In embodiments, the residual colour transform applied during the decoding converts colour pixel components from a YUV color space to a Red-Green-Blue color space. Correspondingly, the residual colour transform applied during the coding converts colour pixel components from a Red-Green-Blue color space to a YUV color space.

Other inventive (and independent) embodiments of the invention are directed to a method of decoding an image formed of a plurality of coding units of pixels in a video sequence, the method comprising, at a decoder:

obtaining, from a bitstream, a residual block of pixels for at least part of a current coding unit;

adding the residual block of pixels to a predictor block of pixels to obtain a corresponding decoded part of the current coding unit;

depending on a residual colour transform, RCT, flag decoded by the decoder for the current coding unit from the bitstream, applying or not a residual colour transform to the residual block of pixels before the step of adding, the residual colour transform converting colour pixel components of the residual block from a colour space to another colour space;

depending on a RDPCM flag decoded by the decoder for the current coding unit from the bitstream, applying or not an RDPCM pixel prediction (in fact a prediction-based reconstruction) to the residual block of pixels before the step of adding, the RDPCM pixel prediction predicting pixels of the residual block based on their neighbouring pixels in the residual block (for instance their vertical or horizontal neighbouring pixels);

wherein the decoder does not decode the RDPCM flag from the bitstream for the current coding unit if the decoder applies the residual colour transform to the residual block of pixels. It means that explicit RDPCM is not applied when RCT is applied.

Correspondingly, a decoding device for decoding an image formed of a plurality of coding units of pixels in a video sequence, the decoding device comprising at least one microprocessor configured for carrying out the steps of this method is provided.

In embodiments, the decoder does not apply any RDPCM pixel prediction, either implicitly or explicitly signalled in the bitstream, if it applies the residual colour transform to the residual block of pixels.

At encoder side, these other inventive embodiments are directed to a method of coding an image formed of a plurality of coding units of pixels in a video sequence, the method comprising:

obtaining a residual block of pixels for at least part of a current coding unit using a predictor block of pixels;

applying a residual colour transform and/or an RDPCM pixel prediction to the obtained residual block of pixels before encoding it into a bitstream, the residual colour transform converting colour pixel components of the residual block from a colour space to another colour space, and the RDPCM pixel prediction predicting pixels of the residual block based on their neighbouring pixels in the residual block;

signalling the applying of the residual colour transform and/or the RDPCM pixel prediction using corresponding flags in the bitstream;

wherein the RDPCM pixel prediction is applied conditionally to the applying of the residual colour transform.

Correspondingly, an encoding device for coding an image formed of a plurality of coding units of pixels in a video sequence, the encoding device comprising at least one microprocessor configured for carrying out the steps of this method is provided.

In embodiments, no parameters for RDPCM pixel prediction are transmitted in the bitstream for the residual block of pixels if the residual colour transform is applied to the residual block of pixels. This means that the explicit RDPCM is exclusive to the applying of RCT.

In embodiments, the residual colour transform and the RDPCM pixel prediction are mutually exclusive one the other, meaning that RDPCM is applied when RCT is not applied to the same residual block, and RDPCM (explicit and implicit) is not applied when RCT is applied to the same residual block.

These configurations make it possible to avoid cascading RCT and RPDCM, thus simplifying the processing at the encoder and at the decoder.

Other inventive (and independent) embodiments of the invention are directed to a method of decoding an image formed of a plurality of coding units of pixels in a video sequence, the method comprising:

obtaining, from a bitstream, a residual block of pixels for at least part of a current coding unit;

applying a residual colour transform and a cross-component prediction to the residual block of pixels, the residual colour transform converting colour pixel components of the residual block from a colour space to another colour space, and the cross-component prediction allowing to predict at least one colour component of a residual block pixel from another colour component of the same residual block pixel;

adding the residual block resulting from the applying step to a predictor block of pixels to obtain a corresponding decoded part of the current coding unit;

wherein applying the residual colour transform is prior to applying the cross-component prediction. In other words, the cross-component prediction is applied to the residual CU once it has been colour transformed.

Correspondingly, a decoding device for decoding an image formed of a plurality of coding units of pixels in a video sequence, the decoding device comprising at least one microprocessor configured for carrying out the steps of this method is provided.

At encoder side, these other inventive embodiments are directed to a method of coding an image formed of a plurality of coding units of pixels in a video sequence, the method comprising:

obtaining a residual block of pixels for at least part of a current coding unit using a predictor block of pixels;

applying a residual colour transform and a cross-component prediction to the obtained residual block of pixels before encoding it into a bitstream, the residual colour transform converting colour pixel components of the residual block from a colour space to another colour space, and the cross-component prediction predicting at least one colour component of a residual block pixel from another colour component of the same residual block pixel;

wherein applying the residual colour transform is after applying the cross-component prediction.

Correspondingly, an encoding device for coding an image formed of a plurality of coding units of pixels in a video sequence, the encoding device comprising at least one microprocessor configured for carrying out the steps of this method is provided.

In embodiments, the applying of the residual colour transform depends on a residual colour transform, RCT, flag signalled in the bitstream for the current coding unit, wherein the RCT flag can take three values, a first one indicating to a decoder that no residual colour transform is to be applied, a second one indicating to the decoder that the residual colour transform is to be applied after the cross-component prediction, and a third one indicating to the decoder that the residual colour transform is to be applied prior to the cross-component prediction.

By performing RCT prior to cross-component prediction at the decoder, and performing the reverse at the encoder in addition to the classical order in a competition, coding efficiency is improved.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device, in particular that of improving coding efficiency of the Palette prediction mode.

Yet another aspect of the invention relates to a device comprising means adapted for carrying out each step of any method as defined above.

Yet other aspects of the invention relate to a method of coding or decoding an image formed of a plurality of coding units of pixels in a video sequence, substantially as herein described with reference to, and as shown in, FIG. 10 or 11 or 12 or 13 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 1:
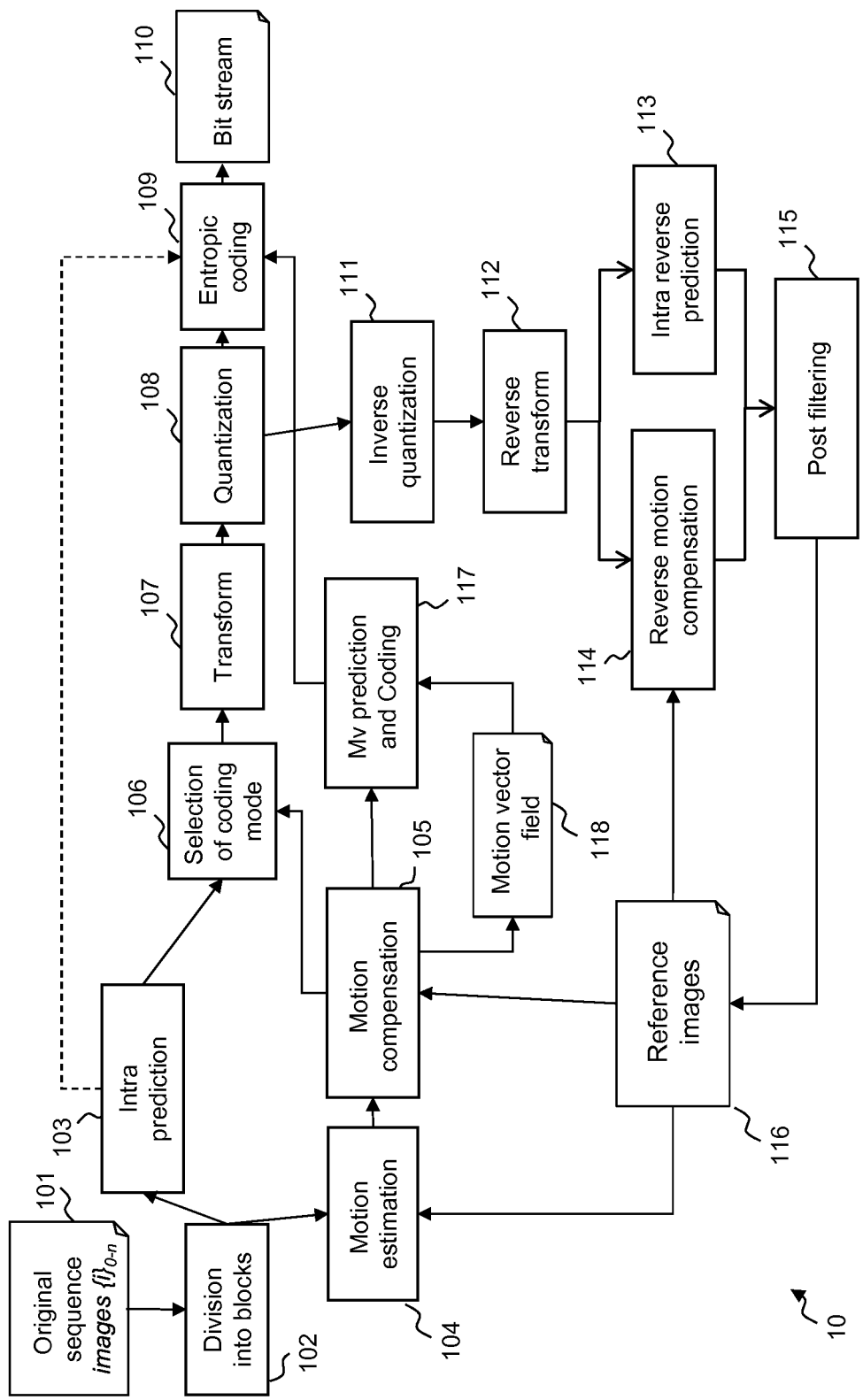
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction (INTRA modes) 103 and the modes based on temporal prediction (INTER, Bidir, Skip modes) based on motion estimation 104 and motion compensation 105.

An INTRA Coding Unit is generally predicted from encoded pixels at its causal boundary by a process called INTRA prediction.

Temporal prediction of INTER coding mode first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106, for example using a Lambda-based criterion such as $D+\lambda \cdot R$, where D is the distortion, $\lambda$ a Lambda or Lagrangian coefficient and R the rate). In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the decoding loop. It means that they need to be applied on the reconstructed frame at the encoder and decoder in order to use the same reference frames at the encoder and decoder. The aim of this post filtering is to remove compression artifacts.

For example, H.264/AVC uses a deblocking filter. This filter can remove blocking artifacts due to the DCT quantization of residual and to block motion compensation. In the current HEVC standard, three types of loop filters are used: deblocking filter, sample adaptive offset (SAO) and adaptive loop filter (ALF).

Figure 2:
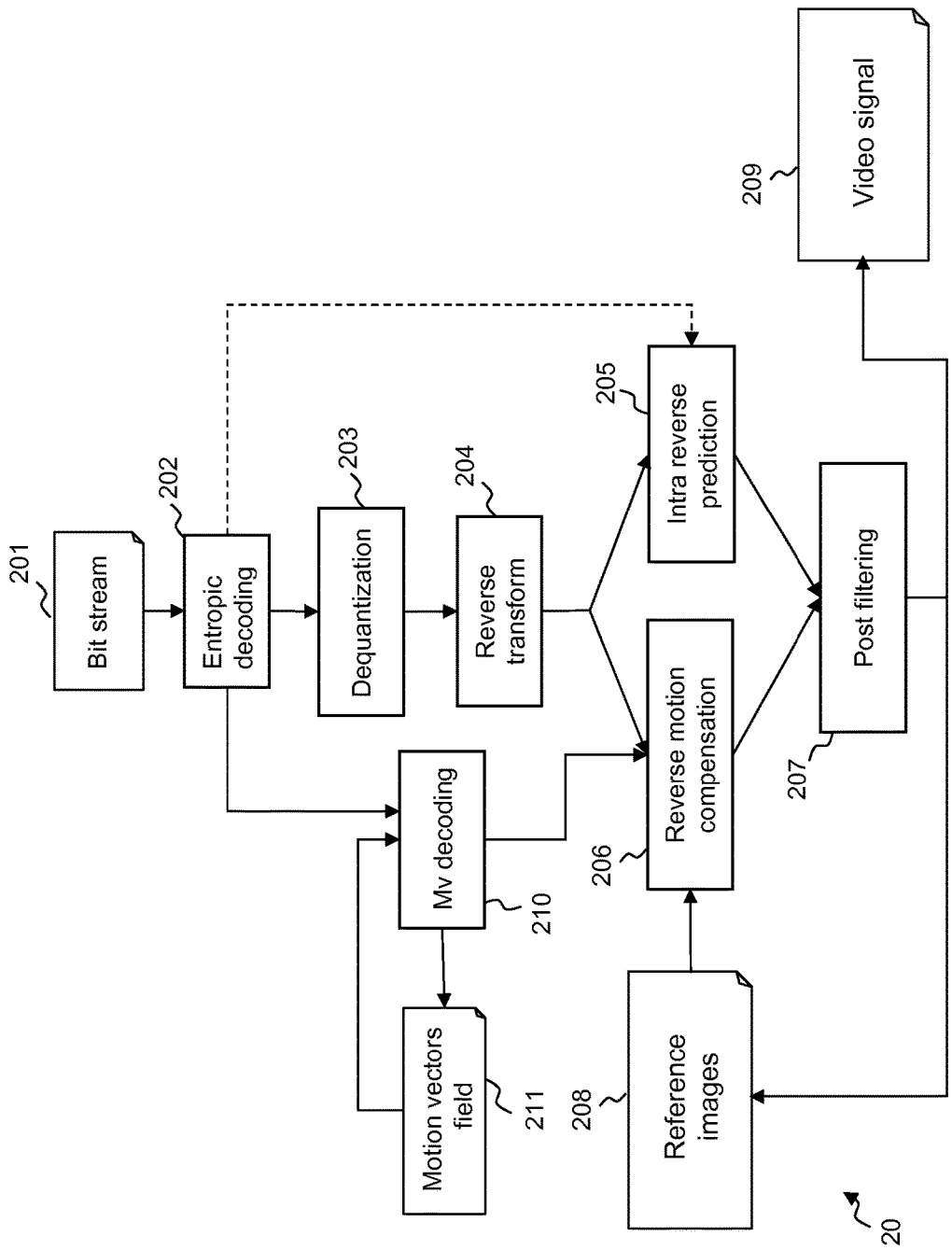
FIG. 2 illustrates the HEVC decoder architecture.

The principle of an HEVC decoder is represented in FIG. 2. The video stream 201 is first entropy decoded in a module 202. The residual data are then inverse quantized in a module 203 and inverse transformed in a module 204 to obtain pixel values forming a residue. The mode data are also entropy decoded and in function of the mode, an INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. The reference area is added to the residue to reconstruct the decoded frame. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

Figure 3:
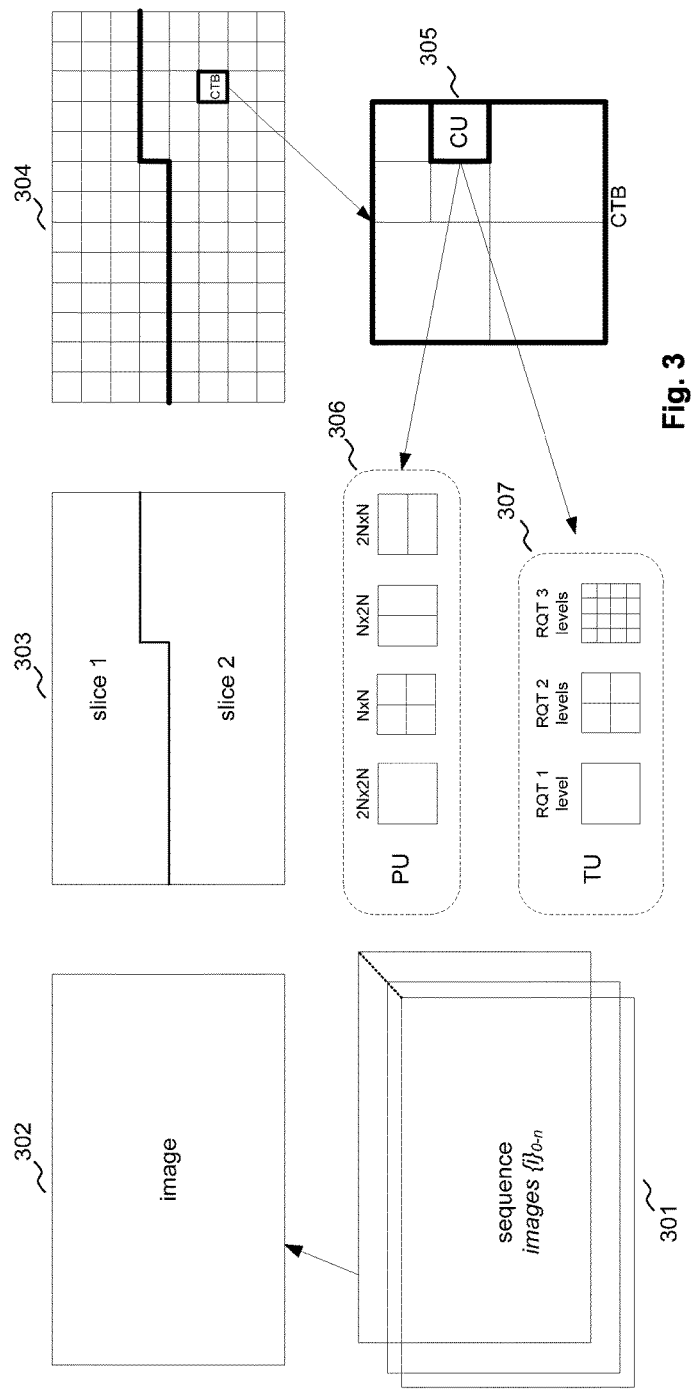
FIG. 3 illustrates the coding structure used in HEVC.

FIG. 3 illustrates the coding structure used in HEVC. The original video sequence 301 is a succession of digital images "images i". As is known per se, a digital image is represented by one or more matrices the coefficients of which represent pixels, the one or more matrices usually corresponding to the colour components, namely Red, Green or Blue in RGB colour space, or Luma, and two Chromas in YUV (Y, Cb, Cr) colour space.

The images 302 are divided into slices 303. A slice is a part of the image or the entire image. In HEVC these slices are divided into non-overlapping Coding Tree Blocks (CTB) 304, generally blocks of size 64 pixels×64 pixels. Each CTB may in its turn be iteratively divided into smaller variable size Coding Units (CUs) 305 using a quadtree decomposition. They can range from a maximum CU size given the CTB (for instance 64×64 pixels, corresponding to CU depth 0) to a minimum CU size (8×8 pixels which corresponds to the maximum CU depth). CUs are constituted of two sub units: Prediction Unit(s) (PU) and Transform Unit(s) (TU) of maximum size equal to the CU's size.

Prediction Unit corresponds to the partition of the CU for prediction of pixels values. Each CU can be further partitioned into a maximum of four square Partition Units or two rectangular Partition Units 306.

Transform units are used to represent the elementary units that are spatially transform with DCT. A CU can be partitioned in TUs based on a quadtree representation 307.

The coding units are the elementary coding elements, i.e. they are the basic units for which a prediction mode is selected, i.e. for which a choice between inter- and intra-prediction is done. It means that all PUs forming the CU are predicted using the same prediction mode selected for the whole CU.

This recursive breakdown of the video sequence into PUs and TUs makes it possible to define parameters at various levels (sequence level, frame level, slice/tile level, CTB level, CU level, and so on). These parameters are syntax elements provided in the bitstream at appropriate locations.

Each slice as defined above is embedded in one NAL (standing for Network Abstraction Layer) unit. Some coding parameters of the video sequence are stored in dedicated NAL units called parameter sets. In HEVC and H.264/AVC two kinds of parameter sets NAL units are employed.

First, the Sequence Parameter Set (SPS) NAL unit that gathers all parameters that are unchanged during the whole video sequence. Typically, it handles the coding profile, the size of the video frames and other parameters.

Secondly, Picture Parameter Sets (PPS) codes the different values that may change from one frame to another. HEVC include also Video Parameter Set (VPS) which contains parameters describing the overall structure of the stream.

As briefly introduced above, a conventional video codec according to HEVC exploits both spatial and temporal correlation between pixels thanks to INTRA and INTER coding modes. The INTRA coding modes exploit spatial correlation of the pixels in the current frame to provide spatial prediction. The INTER coding modes exploit temporal correlation between pixels of the current frame and previous encoded/decoded frames to provide temporal prediction.

The current design of HEVC uses three different INTER coding modes: the Inter mode, the Merge mode and the Merge Skip mode. The main difference between these modes is the data signalling in the bitstream.

In the Inter mode, all data are explicitly signalled in the bitstream for the concerned Coding Unit, meaning that the texture residue is coded and inserted in the bitstream, and all data for the motion information are also coded and inserted in the bitstream. The motion information includes the direction type (uni or bi-directional), the list index (if needed), the related reference frame indexes, and the motion vector value. Note that, in current version of HEVC, the motion vector value is predicted by a selected motion vector predictor (see block 117 in FIG. 1). The motion vector residual (mvd) for each component is coded and inserted in the bitstream followed by the predictor index mvp_I0_flag or mvp_I1_flag.

In the Merge mode, the texture residue is coded and inserted in the bitstream; and only a predictor index is coded and inserted in the bitstream regarding the motion information. It means that no motion vector residual, direction type, list or reference frame index is coded. Prediction of all these motion parameters is thus provided through the predictor index, meaning that they are derived from the predictor index.

In the Merge Skip mode, no information is transmitted to the decoder side except the "mode" (i.e. Merge Skip using a flag) and a predictor index. It is the same processing as the Merge mode except that no texture residual is coded or transmitted, meaning that the pixel values of a Merge Skip block are the pixel values of the block predictor.

For the remainder of the description, reference to the INTER mode means reference to any of Inter mode, Merge mode or Merge Skip mode. Thus, a CU is coded in INTER means that its coding mode is Inter or Merge or Merge Skip mode. Except for the Merge Skip mode, a residue is transmitted in the bitstream.

Also INTRA mode refers to all the planar mode, DC mode and 32 directional modes (including a horizontal mode and a vertical mode). In INTRA mode, a residue (of the considered Coding Unit) is transmitted in the bitstream. IBC mode refers to Intra Block Copy mode in which a residue is also transmitted in the bitstream.

As introduced above, the residue is first compressed before being added to the bitstream.

Syntax elements are provided in the bitstream to help the decoder to decode the image. For instance, for each CU, a syntax element named rqt_root_cbf (residual quadtree_root_coded block flag) is transmitted to indicate if the CU has non-zero transformed coefficients or not, where a "1" indicates at least one existing non-zero coefficient for the whole CU and a "0" indicates no non-zero coefficient.

Also, for each TU, a syntax element named cbf (coded block flag; cbf_luma for the Luma component and cbf_chroma for the Chroma components) is transmitted to indicate if the TU has non-zero transformed coefficients or not, where a "1" indicates at least one existing non-zero coefficient and a "0" indicates no non-zero coefficient.

Depending on the implementation of HEVC, the residue can be transformed using a conventional DCT 107 and then quantized 108, or the transformation can be skipped (Transform Skip mode) while the quantization 108 is performed, or both the transformation and the quantization can be bypassed (TransQuant Bypass mode).

To signal the Transform Skip mode, a flag, transform_skip_flag, is defined at CU or TU level. It takes the value "1" (enabled) if DCT transform 107 is skipped. Otherwise, it takes the value "0" (disabled).

Similarly, To signal the TransQuant Bypass mode, a flag, cu_transquant_bypass_flag, is defined at CU or TU level. It takes the value "1" (enabled) if both the DCT transform 107 and quantization 108 are bypassed. Otherwise, it takes the value "0" (disabled).

In both Transform Skip mode and TransQuant Bypass mode, the residue that is transmitted is in the pixel (spatial) domain, because no transform has been applied on it.

For HEVC RExt, two tools have been added that operate when the transform 107 is skipped or bypassed for a residual: the residual modification process for blocks using a transform bypass (RDPCM) and the Cross-Component Prediction.

The unit of a residual coding block is a TU (transform unit) in HEVC specification.

As, the input signal YUV or RGB is not taken into account for the decoding process in HEVC, decision has been taken to use YUV components in the following description although the same applied with RGB or GRB signals used as input signal.

The RDPCM method is used only when the transformation is skipped (Transform Skip mode or TransQuant Bypass mode). RDPCM consists in predicting each residual pixel value (of the residue) by its neighbouring residual pixel value.

Two directions can be used in HEVC Rext: the horizontal prediction or the vertical prediction.

Figure 4:
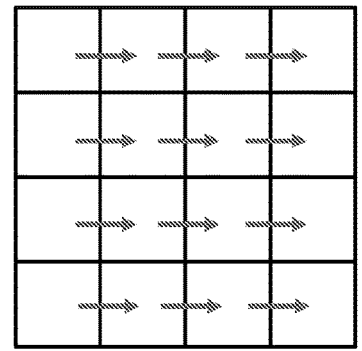
FIG. 4 illustrates two predictions for a 4×4 residual block in the RDPCM method provided in HEVC RExt.
Figure 4:
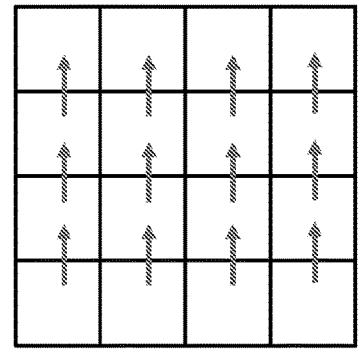

FIG. 4 illustrates these two predictions for a 4×4 residual block. As far as the horizontal prediction is concerned, the first row is not predicted, each residual pixel value of a following row is predicted using the co-located residual pixel value in the preceding row. The same applies for the vertical prediction, but considering lines instead of rows: in particular, the first line is not predicted.

In practice, RDPCM is applied to each colour component independently. This transpires from the exemplary steps of FIG. 5 and FIG. 6 described below.

RDPCM can be implicit or explicit (in which case it is signalled in the bitstream using a flag, explicit_rdpcm_flag, at CU or TU with the value "1" if RDPCM is applied). RDPCN is implicit for all INTRA modes except for the horizontal INTRA mode (direction 10) and the vertical INTRA mode (direction 26), meaning that RDPCM is systematically applied to residues for Coding Unit coded using these INTRA modes; and the direction prediction for RDPCM depends on the INTRA mode number (0 to 34 excluding 10 and 26).

The second tool, namely the cross-component prediction, consists to predict the U and V components using the Y component. This prediction is applied for each Chroma component (UV) and can be written for an encoding process as follows:

$$rCb = rCb - \alpha rY$$

$$rCr = rCr - \beta rY$$

Correspondingly, at the decoder, the inverse prediction is as follows:

$$rCb = rCb + \alpha rY$$

$$rCr = rCr + \beta rY$$

Parameters $\alpha$ and $\beta$ are transmitted according to conditions described below with reference to FIG. 5. In embodiments, parameters $\alpha$ and $\beta$ are always transmitted, meaning that the cross-component prediction is disabled when $\alpha$ or $\beta$ are set to 0.

Figure 5:
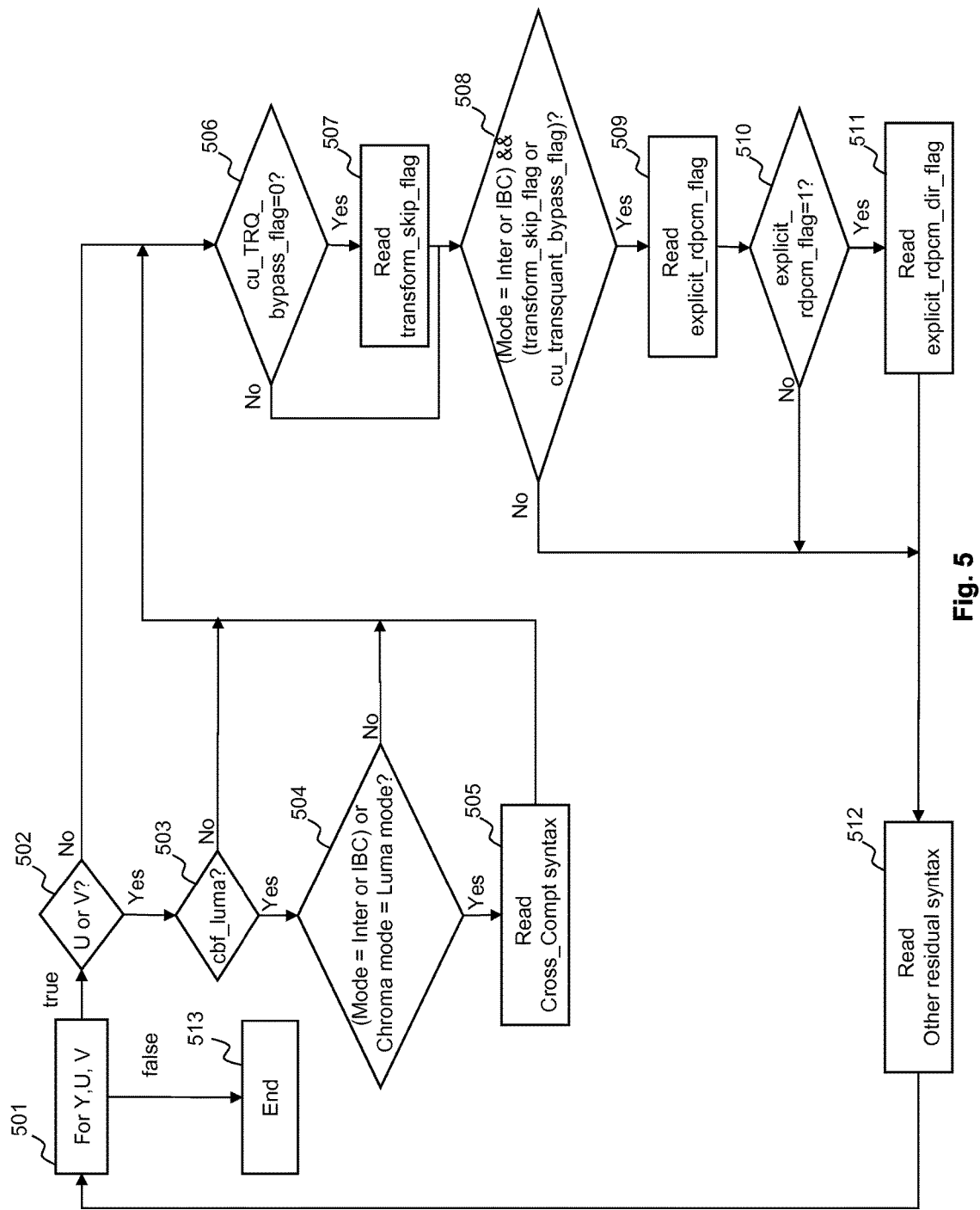
FIG. 5 illustrates an exemplary decoding process of some syntax elements for the residue, involving RDPCM and cross-component prediction.

FIG. 5 illustrates an exemplary decoding process of some syntax elements for the residue, involving both tools RDPCM and cross-component prediction. One skilled in the art can infer the corresponding steps at the encoder, from the following description.

A residue for each colour component Y,U,V can be decoded for a TU 501 according to each cbf flag decoded. If the cbf flag for a component is "0", no syntax is decoded for that component (513).

If the current colour component is U or V (test 502), the cross-component prediction can be applied if the cbf_luma flag is true, meaning that there are residual values for the Luma component (test 503).

Additional test 504 is to apply the cross-component prediction only if the coding mode is INTER (Inter mode or Merge mode—not Merge Skip mode since a residue is obtained from the bitstream) or is IBC or is the INTRA mode with the same mode for Luma and Chroma components.

If test 504 is positive, the cross-component prediction syntax elements are extracted from the bitstream at step 505.

For all components (i.e. in case of output "no" at tests 502, 503 and 504, as well as after step 505), it is determined whether or not the DCT transform 107 is skipped or bypassed. This may be done by reading the two flags transform_skip_flag and cu_transquant_bypass_flag.

In the implementation of the Figure, first step 506 determines whether or not the transform and quantization are bypassed for the current CU by comparing flag cu_transquant_bypass_flag to 0. If it is (flag=0), the transform_skip_flag is extracted from the bitstream at step 507 to know if the residual is transformed or not.

Next to the determination of whether or not the DCT transform 107 is skipped or bypassed, the process now reads the syntax elements for RDPCM in appropriate cases only. This is steps 508 to 511.

If the coding mode is INTER (Inter mode or Merge mode) or IBC and if the transform 107 is skipped 508 (Transform Skip mode or TransQuant Bypass mode), the explicit_rdpcm_flag is extracted from the bitstream 509 for the current Coding Unit. It means that the explicit RDPCM can be applied only for INTER mode or IBC mode.

If the explicit RDCMP flag is true at test 510, RDPCM prediction syntax element, i.e. the direction specified in explicit_rdpcm_dir_flag) is extracted from the bitstream at step 511.

Next or in case of output "no" at test 508, the next residual syntax elements are decoded at step 512, in order to produce the residue rX (with X=Y, Cb, Cr) associated with the current colour component.

Once all the syntax elements for the two tools (RDPCM and Cross-Component Prediction) have been decoded, they can be applied.

Figure 6:
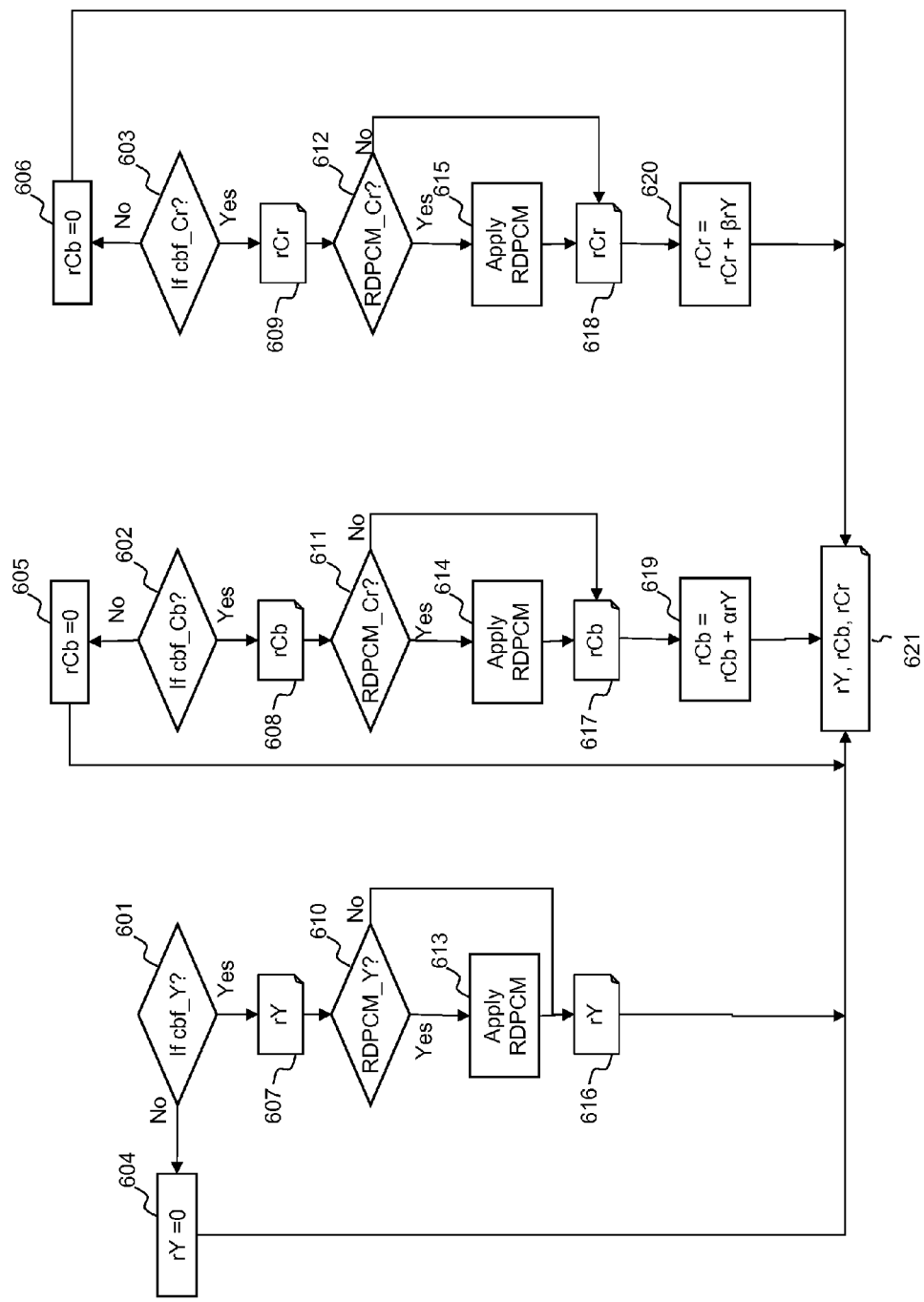
FIG. 6 illustrates an exemplary processing for decoding a residue at Transform Unit level, based RDPCM and cross-component prediction.

FIG. 6 illustrates an exemplary processing for decoding a residue, based on these two tools.

For each colour component (processing can be performed in parallel), the decoder checks whether or not the corresponding cbf flag 601, 602, 603 is true.

If it is not, the residue of the corresponding colour component is set equal to 0 604, 605, 606.

If the cbf flag is true, the corresponding residue 607, 608, 609 is obtained according to the decoded residual syntax elements.

If the transform 107 is skipped and if RDPCM must be applied 610, 611, 612 (due to the explicit_rdpcm_dir_flag or to the implicit RDPCM for some INTRA modes), it is applied 613, 614, 615.

Next, for the U and V colour components (Cb, Cr), the cross-component prediction is applied 619, 620 on their residue, if the Luma residual is not equal to 0. It is reminded that if α and β, the result is that no RDPCM is applied (due to the formula).

The resulting residues for the three colour components are then obtained 621, thus forming a 3-component residue for the current Coding Unit.

As briefly suggested in the BACKGROUND section, HEVC provides specific tools to efficiently code "screen contents" sequences. This is the Screen Content Coding extension of HEVC, which is being drafted. It is based on HEVC Rext, and thus contains by default, all other tools defined for the Range Extension, in particular those tools described above.

The new "Screen Content" tools are the Intra block copy mode (already introduced above), the Palette mode (also mentioned above) and the Adaptive Residual Colour Transform which is specifically dealt with in the present invention. The Adaptive Residual Colour Transform (ARCT) is a process performed on the residue obtained after prediction in the encoding process.

In the current HEVC Screen Content extension, an implementation of the Palette mode has no residue transmitted in the bitstream, meaning that it cannot be combined with ARCT.

The Intra Block Copy (IBC) is a prediction method which is particularly well suited for extremely repetitive patterns. The block predictor of an IBC Coding Unit comes from the causal area of the current frame which has been reconstructed (without loop filtering). At decoder side, the block vector is decoded in order to obtain the current IBC block predictor. And this block predictor is added to the decoding residue if it exists, in order to obtain the reconstructed block of IBC.

Back to the Adaptive Residual Colour Transform tool, it is used to decorrelate the signal (at residue level) in order to concentrate the residual entropy signal in one colour component. In the current version of the HEVC screen content draft, this transform is set and it is based, at decoder side, on a classical YCoCg-to-RGB transform (meaning that it is a RGB-to-YCoCg transform at coder side). ARCT is very efficient to decorrelate RGB signal, and this it is often used for RGB sequences. Yet, ARCT also gives noticeable gains for YUV sequences.

ARCT is generally enabled or disabled at sequence level using a specific flag, namely residual_adaptive_colour_transform_enabled_flag, provided in the sequence parameter set (SPS). The flag is 1 if ARCT is enabled, and is 0 otherwise.

When ARCT is enabled, use or not of ARCT is defined at CU level using another flag, namely cu_residual_act_flag, which is 1 if ARCT has to be applied to the residue of the current CU, and is 0 otherwise.

Figure 7:
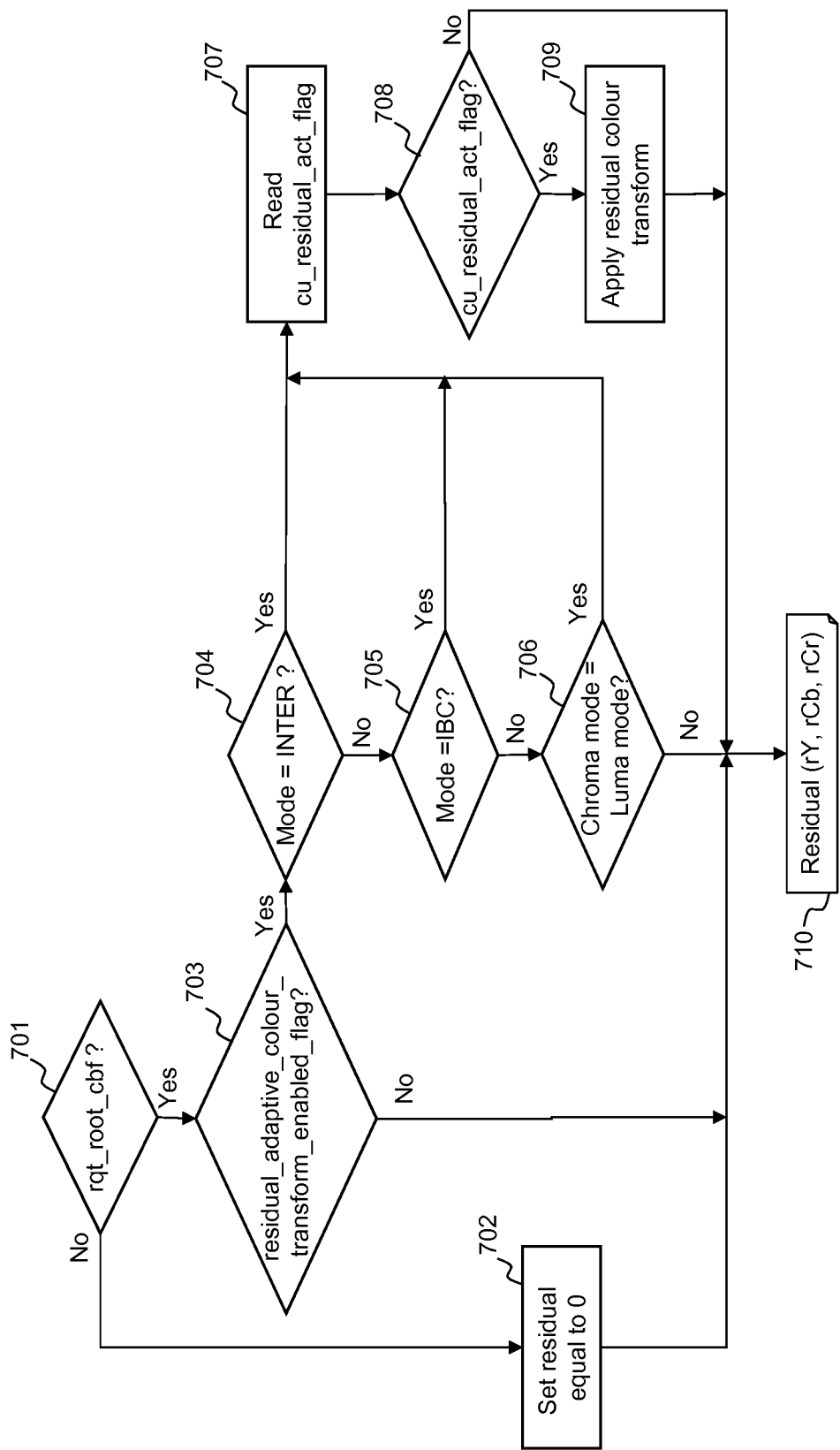
FIG. 7 illustrates an exemplary decoding process using adaptive residual colour transform (ARCT)

FIG. 7 illustrates an exemplary decoding process for a current Coding Unit when ARCT is enabled at sequence level (residual_adaptive_colour_transform_enabled_flag equal to 1).

The process is applied only if a residue exists, which means that the flag rqt_root_cbf is checked (to be equal to 1) at step 701. As a consequence, if the flag is 0, the residue for the current CU is set equal to 0 at step 702.

If the residue exists (flag equal to 1), it has already been decoded for each Transform Unit as described above with reference to FIG. 6. The residual Coding Unit is thus available at the decoder.

A check 703 is performed to determine whether or not ARCT is enabled (check of flag residual_adaptive_colour_transform_enabled_flag). If it is not, the available residual Coding Unit is the output of the overall process (710) since no colour transform has to be applied to it.

If ARCT is enabled, the coding mode of the current Coding Unit is checked at steps 704, 705 and 706, respectively for INTER mode (Inter mode or Merge mode), then for the IBC mode if the check 704 is negative, and then for the INTRA mode with the same Luma and Chroma modes if the check 705 is negative.

If one of these modes is detected, the process continues with step 707 where the flag cu_residual_act_flag is extracted from the bitstream.

The value of the extracted flag is checked at step 708 to know whether or not ARCT is actually applied to the current Coding Unit.

If it is equal to 1, ARCT is applied at step 709. Otherwise the available residual Coding Unit is not modified and forms the output of the overall process (710). It means that depending on a residual colour transform, RCT, flag signalled in the bitstream, the process decides to apply or not a residual colour transform to the residual block of pixels, the residual colour transform converting colour pixel components of the residual block from a colour space to another colour space.

Note that ARCT is applied at step 709 for each residual pixel of the (available and) current residual Coding Unit.

The colour transform ARCT is applied to the three colour components Y, Cb, Cr (YUV) because it converts from one colour space to another colour space.

An ARCT may be applied to a residue, the latter being transformed using DCT transform 107 or not (i.e. the transform is skipped or bypassed), and being quantized using quantization 108 or not (i.e. the quantization may be bypassed). However, the ARCT algorithm is not the same whether the transform and the quantization are bypassed or not.

When the transform and the quantization are bypassed (flag cu_transquant_bypass_flag equals 1 for the current Coding Unit), the following process may be applied:

$tmp = rY - (rCb >> 1)$ $rY = tmp + rCb$ $rCb = tmp - (rCr >> 1)$ $rCr = rCb + rCr$ where tmp is a temporary variable, and rY, rCb, rCr are the residues for respectively colour components Y, Cb, Cr. This process basically corresponds to a YCoCg-to-RGB colour transform.

In the other cases (i.e. as soon as the quantization is applied), the following inverse transform may be used:

$tmp = rY - rCb$ $rY = rY + rCb$ $rCb = tmp - rCr$ $rCr = tmp + rCr$ with the same variables.

This process corresponds to a low memory implementation and it is considered that the input signal at encoder side was GBR and not RGB (and consequently the output signal is GBR).

Usually the transform can be written as:

$$\begin{bmatrix} rY \\ rCb \\ rCr \end{bmatrix} = \begin{pmatrix} 1 & 1 & 0 \\ 1 & -1 & -1 \\ 1 & -1 & 1 \end{pmatrix} \begin{bmatrix} rY'' \\ rCb \\ rCr' \end{bmatrix}$$

If we consider the RGB and not GBR, this transformation is:

$$\begin{bmatrix} rY \\ rCb \\ rCr \end{bmatrix} = \begin{pmatrix} 1 & 1 & -1 \\ 1 & 0 & 1 \\ 1 & -1 & -1 \end{pmatrix} \begin{bmatrix} rY'' \\ rCb \\ rCr' \end{bmatrix}$$

This corresponds to a classical YcoCg-to-RGB colour conversion.

Note that for the pixels without residue for the three colour components, ARCT doesn't need to be applied, to avoid useless calculations.

At encoder side, the forward transform is applied, usually RGB-to-YCoCg colour transform.

In case quantization 107 is not bypassed, ARCT can be written as follows:

$$\begin{bmatrix} rY'' \\ rCb \\ rCr' \end{bmatrix} = \frac{\begin{pmatrix} 2 & 1 & 1 \\ 2 & -1 & -1 \\ 0 & -2 & 2 \end{pmatrix} \begin{bmatrix} rY \\ rCb \\ rCr \end{bmatrix}}{4}$$

This transformation corresponds to GBR to YCoCg. For RGB signal this transform is:

$$\begin{bmatrix} rY'' \\ rCb \\ rCr' \end{bmatrix} = \frac{\begin{pmatrix} 1 & 2 & 1 \\ 2 & 0 & -2 \\ -1 & 2 & -1 \end{pmatrix} \begin{bmatrix} rY \\ rCb \\ rCr \end{bmatrix}}{4}$$

All the details provided above at decoder side (for instance the use of flags at various levels in the coding structure) are implemented in corresponding manners at encoder side (for instance the addition of flags in the bitstream at appropriate levels of the coding structure) without difficulties for one skilled in the art.

At the encoder, ARCT is evaluated Coding Unit by Coding Unit to know if it should be applied to the current Coding Unit. This is evaluated when the residue Coding Unit is evaluated. This implies that a lot of evaluations are performed to consider all possible quadtrees for the coding structure (the encoder evaluates different CU splitting from the larger CU size to the minor CU size).

In the current HEVC Screen Content extension encoder software, the residue of a Coding Unit is fully encoded in order to obtain a Rate-Distortion Cost and all parameters for a residue: Residual colour transform flag, TU splitting, cross-component prediction parameters, RDPCM, Transform Skip or DCT and the residue itself. This evaluation is computed several times for each Coding Unit and for each tested coding mode with a residue (Inter mode, Inter Merge mode, Intra modes, IBC mode, etc.) with the particularity that additional evaluations are required for a mode as for the Merge mode where the residue is sometimes evaluated for each Merge candidate. Note that the residual evaluation is quite the same for all coding modes with some variations.

Figure 8:
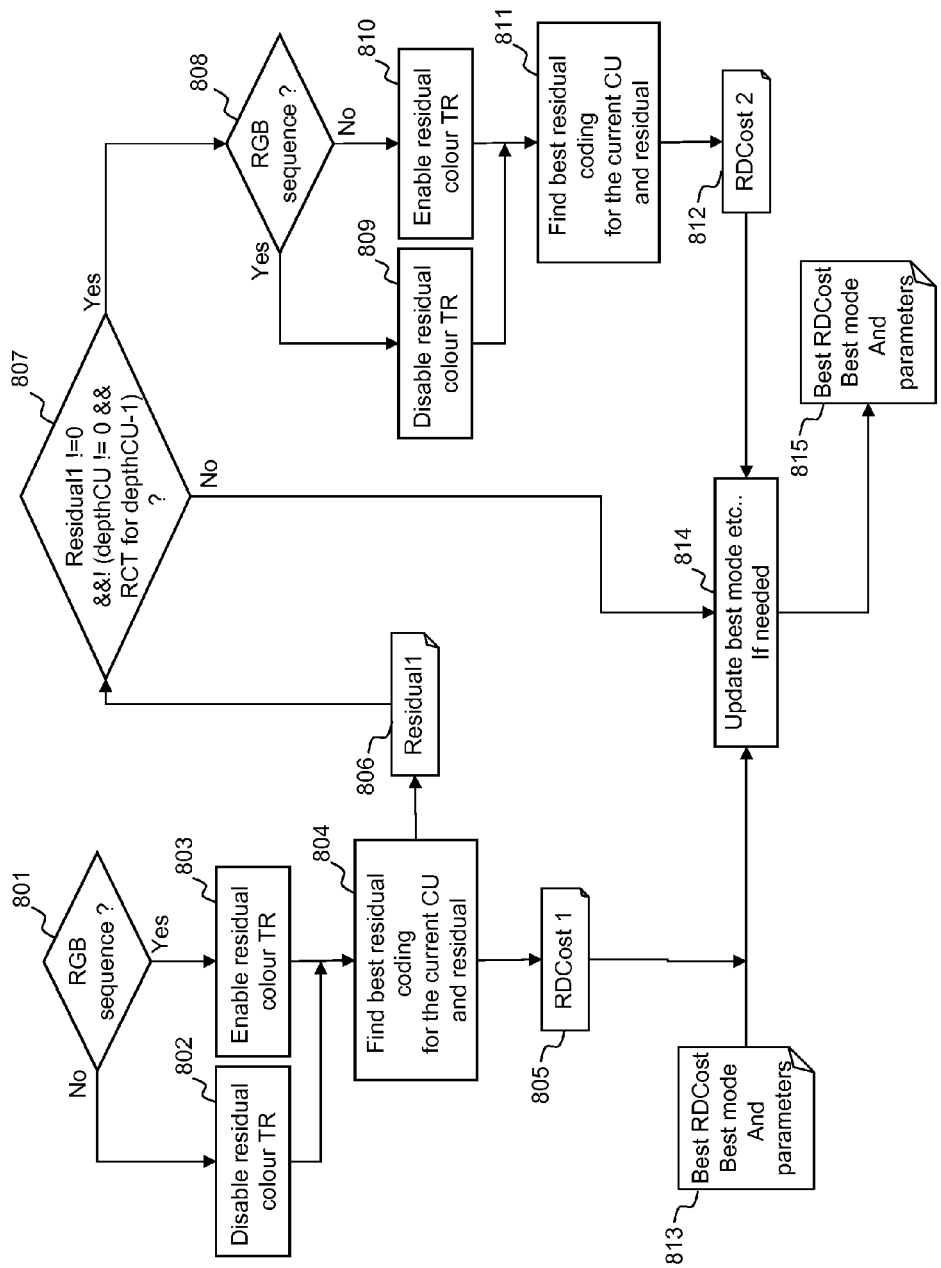
FIG. 8 illustrates an example of the evaluation of ARCT at encoder side.

FIG. 8 illustrates an example of the evaluation of ARCT at encoder side. The evaluation depends on the colour type of the input sequence, i.e. whether the sequence is RGB or not (i.e. YUV). It is the subject matter of test 801.

If the sequence is RGB, ARCT is activated at step 803. Otherwise it is not activated at step 802. It means that ARCT is about to be applied or not on the tested residue.

Next to steps 802 and 803, the encoder fully evaluates the residual coding at step 804. This consists in finding the best parameters for the current residue Coding Unit: TU splitting, cross-component parameters, RDPCM, Transform Skip or DCT and the residue itself, etc. . . . .

A Rate-Distortion cost, RDCost1, for this first evaluation is obtained at block 805 and the related residue, Residual1, is obtained at block 806.

Next, the following condition is tested at step 807: residual1 is different from 0 and if the CU depth is 0 (meaning that the size of the CU is the biggest. For IBC, the maximum CU size is 16×16) or if the CU depth is different from zero and the evaluated residual of the CU depth minus 1 doesn't use ARCT.

If condition 807 is met, a second evaluation loop is performed during which it is first tested whether or not the sequence is RGB (text 808). If it is, ARCT is not activated (disabled) at step 809 for the second evaluation loop. Otherwise it is activated (enabled) at step 810.

In a similar fashion to the first loop (804), the residue is evaluated at step 811 and a Rate-Distortion cost, RDCost2, is obtained at block 812.

RDcost1 805 and RDCost2 (if there is one) 812 and the Best RDCost 813 already evaluated for other coding modes for the current CU are compared. If one of RDCost1 805 and RDCost2 812 is better than the current best RDCost 813, the best RDCost and the related parameters are updated at step 815.

Figure 10:
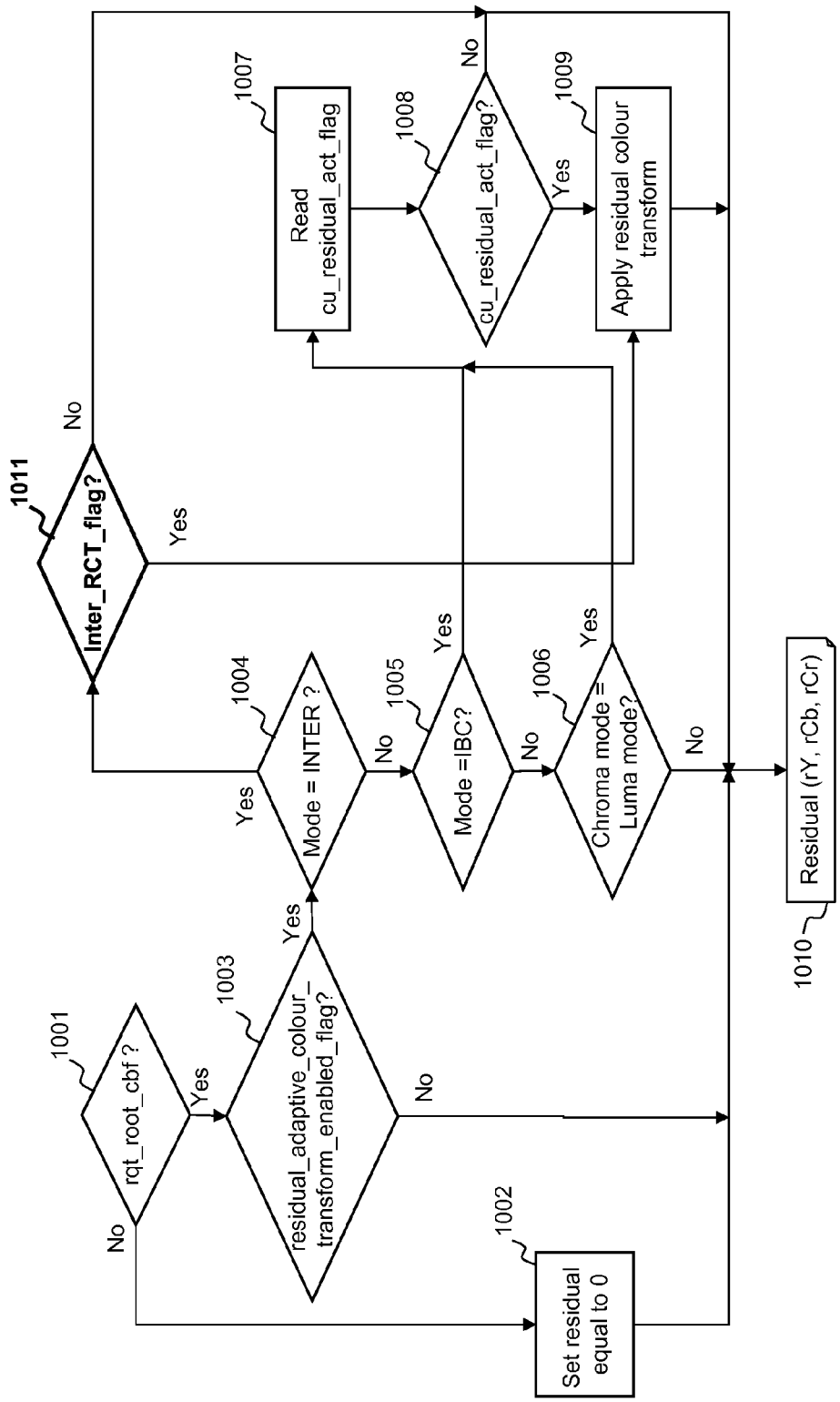
FIG. 10 illustrates an exemplary decoding process when the residual colour transform is not adaptively selected for INTER modes (Inter mode and Merge mode)
Figure 11:
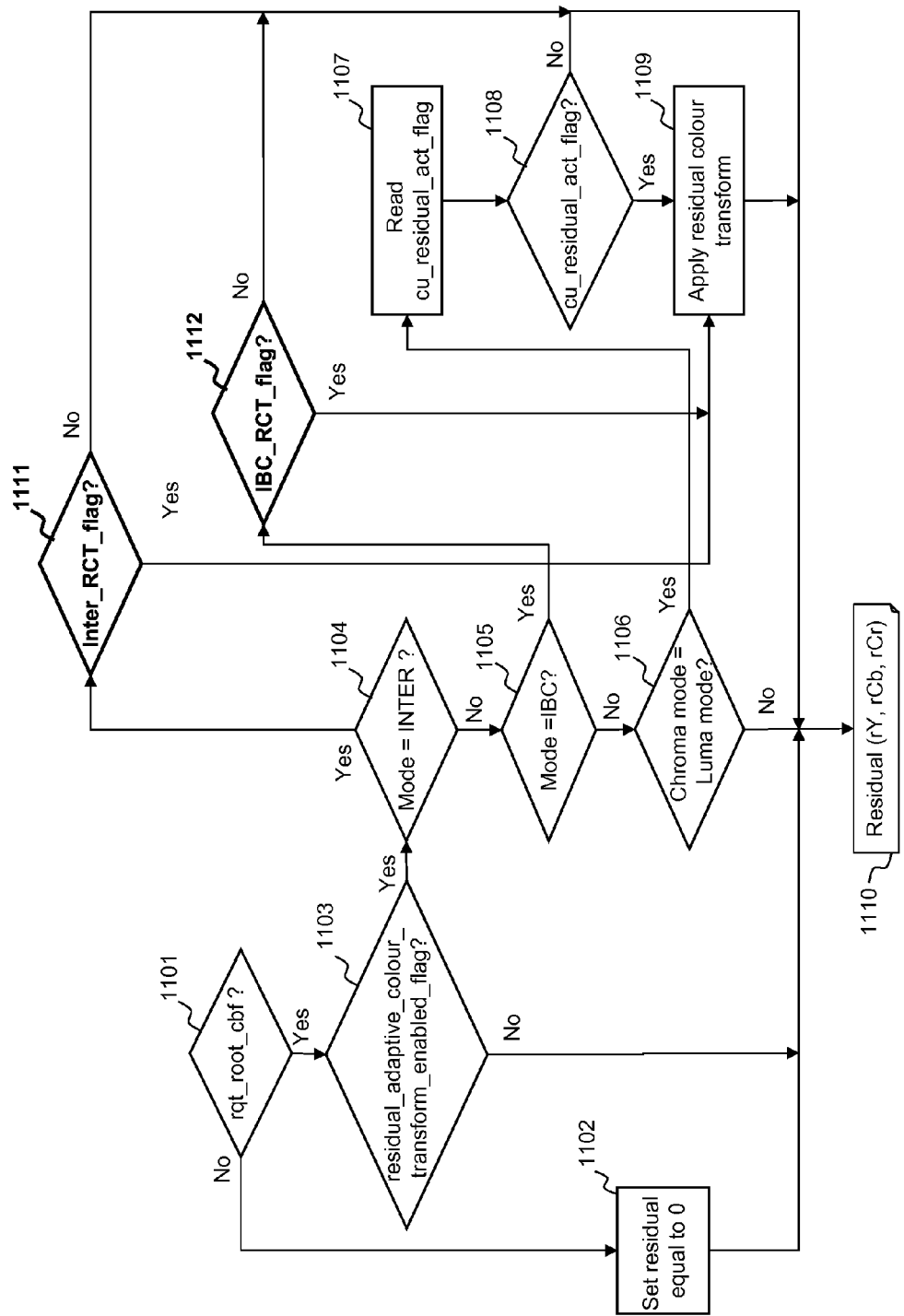
FIG. 11 illustrates an exemplary decoding process when the residual colour transform is not adaptively selected for INTER modes (Inter mode and Merge mode) and for IBC mode.

FIGS. 10 and 11 illustrate various embodiments of the present invention, wherein the RCT flag signalling ARCT in the bitstream is associated with two or more coding units forming the image. It means that the residual colour transform is no longer selected at CU level but at a higher level, for instance at a sequence level or a frame level or a slice or tile level or a coding tree block level where a coding tree block includes a plurality of coding units forming the image.

Furthermore, the RCT flag associated with two or more coding units is defined for coding units coded using at least one specific prediction-based coding mode.

For instance, in the case of FIG. 10, the specific prediction-based coding mode is the INTER prediction coding mode. It means that the residual colour transform is not adaptively selected for INTER modes (Inter mode and Merge mode). In such a case, the syntax element cu_residual_act_flag is not decoded when the mode is INTER (Inter mode and Merge mode), but the RCT flag at higher level is.

In the case of FIG. 11, another specific prediction-based coding mode is the Intra Block Copy (IBC) coding mode. It means that the residual colour transform is not adaptively selected for IBC mode. Also, in such a case, syntax element cu_residual_act_flag is not decoded when the mode is IBC, but the RCT flag at higher level is.

FIG. 10 illustrates an exemplary decoding process when the residual colour transform is not adaptively selected for INTER modes (Inter mode and Merge mode). This Figure is based on FIG. 7 previously described: steps 1001-1010 correspond to steps 701-710 respectively and are not further described.

The specificity of this embodiment of the invention occurs for INTER modes, i.e. when it is detected that the current coding mode is INTER at step 1004. In such a situation, the decoder checks whether or not the value of the RCT flag, namely inter_RCT_flag (or inter_residual_colour_transform_flag) for the following description, is 1. This is test 1011 to know if the residual colour transform is applied to the current residual Coding Unit or not.

If inter_RCT_flag=1, the residual colour transform is applied at step 1009. Otherwise, the non-modified residue is output.

In a preferred embodiment, flag inter_RCT_flag is transmitted in the sequence parameters set (SPS), i.e. at sequence level. Of course, in variants, it may be transmitted at CTB, Slice or frame level.

At encoder side, flag inter_RCT_flag is set equal to 1 for RGB sequences and to 0 for YUV sequences. For RGB sequences, the residual colour transform de-correlates the residual and the adaptation at CU level is not needed if a flag needs to be transmitted.

The embodiment of FIG. 10 provides an encoding time reduction because the residual colour transform does not need to be evaluated at CU level for INTER modes (i.e. for each Coding Unit).

Moreover, some bitrate reduction can be observed since a CU level flag is removed and replaced by a less frequent flag (at higher level).

Turning now to the embodiment of FIG. 11, the latter illustrates an exemplary decoding process when the residual colour transform is not adaptively selected for INTER modes (Inter mode and Merge mode) and for IBC mode. In a slight variant, only the not-adapted selection of the RCT for IBC mode can be proposed.

This Figure is based on FIG. 10 (and thus on FIG. 7) previously described: steps 1101-1110 correspond to steps 1001-1010 (and thus to 701-710) respectively and are not further described.

The additional specificity of this embodiment of the invention (additional to the specificity of FIG. 10) occurs for IBC mode, i.e. when it is detected that the current coding mode is IBC at step 1005. In such a situation, the decoder checks whether or not the value of the corresponding RCT flag for IBC mode, namely ibc_RCT_flag (or ibc_residual_colour_transform_flag) for the following description, is 1. This is test 1112 to know if the residual colour transform is applied to the current residual Coding Unit or not.

If ibc_RCT_flag=1, the residual colour transform is applied at step 1109. Otherwise, the non-modified residue is output.

In a preferred embodiment, flag ibc_RCT_flag is transmitted in the sequence parameters set (SPS), i.e. at sequence level. Of course, in variants, it may be transmitted at CTB, Slice or frame level.

At encoder side, flag ibc_RCT_flag is set equal to 1 for RGB sequences and to 0 for YUV sequences. For RGB sequences, the residual colour transform de-correlates the residual and the adaptation at CU level is not needed if a flag needs to be transmitted.

The embodiment of FIG. 10 provides an encoding time reduction because the residual colour transform does not need to be evaluated at CU level for INTER modes (i.e. for each Coding Unit).

Moreover, some bitrate reduction can be observed since a CU level flag is removed and replaced by a less frequent flag (at higher level).

Note that in the slight variant in which only the not-adapted selection of the RCT for IBC mode is proposed (and not for INTER modes), only flag ibc_RCT_flag is transmitted in the bitstream and not flag inter_RCT_flag.

Although FIGS. 10 and 11 described embodiments of the invention at decoder side, one skilled in the art directly understands the corresponding process at encoder side, for instance setting the inter_RCT_flag and/or ibc_RCT_flag to the appropriate value at sequence level, to active or not RCT for all the INTER-coded CUs and/or all the IBC-coded CUs respectively.

Of course other variants than providing a RCT flag at level higher than CU level for INTER modes and IBC modes may involve other coding modes, for instance the INTRA modes. In such case, a similar flag can be transmitted for the INTRA modes at sequence level. Such flag may take three values as described below.

Figure 9:
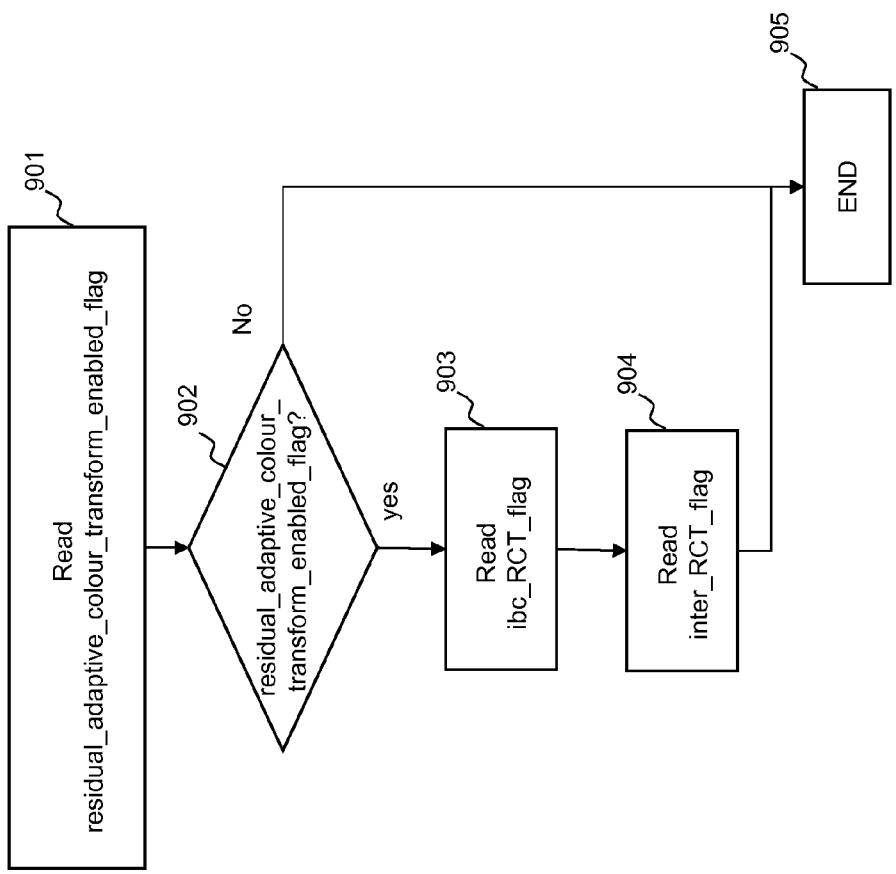
FIG. 9 illustrates an adapted process for reading (by a decoder) the sequence parameters set when inter_RCT_flag and ibc_RCT_flag are used.

FIG. 9 illustrates an adapted process for reading (by the decoder) the sequence parameters set when the inter_RCT_flag and ibc_RCT_flag are used.

First flag residual_adaptive_colour_transform_enabled_flag is decoded at step 901. It is reminded that this flag enables or disables RCT (i.e. authorize or not the use of RCT for the residues of the sequence).

If the flag is true (test 902), the flag ibc_RCT_flag is read (decoded) at step 903 and flag inter_RCT_flag is read (decoded) at step 904. Next, the process ends at step 905.

Although these examples uses one-bit flags that can take only two values, other embodiments may use two-or-more-bits flags.

For instance, flag ibc_RCT_flag can take three values, 0, 1, 2. '0' means that RCT is not applied, '1' means that RCT is applied for all the IBC-coded CUs of the sequence (or frame or slice or tile or CTB), and '2' means that RCT is adaptively selected at CU level like in the prior use (thus requiring flag cu_residual_act_flag to be defined for each CU). The use of a three-value ibc_RCT_flag can improve coding efficiency, in particular for RGB sequences.

The same may applies for flag inter_RCT_flag.

Other improvements of HEVC are provided through FIGS. 12 and 13 described below, which relate to RCT and RDPCM or cross-component prediction. These improvements are independent one from each other, and from the inventive improvement described above with reference to FIGS. 9 to 11. Although independent, all or part of these various improvements may be combined together.

Figure 12:
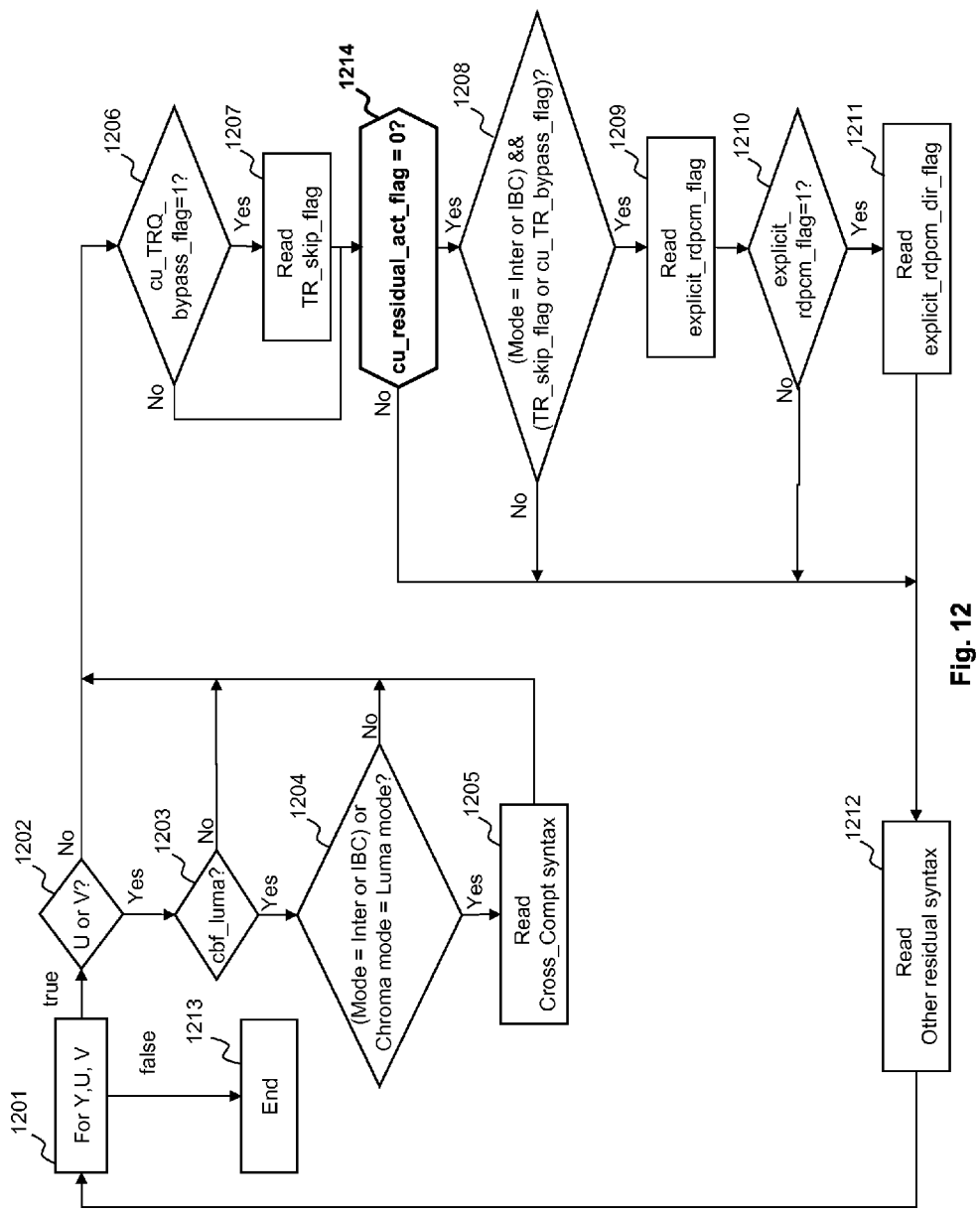
FIG. 12 illustrates an exemplary implementation of the decoding of syntax elements when RDPCM is applied conditionally to applying ARCT.

In the improvement of FIG. 12, the RDPCM pixel prediction is applied conditionally to the applying of the residual colour transform. In other words, the use of the RDCPM method (transform bypass) is conditionally enabled according to the use of residual colour transform.

FIG. 12 illustrates an exemplary implementation of the decoding of the syntax elements. The Figure is based on FIG. 5 previously described: steps 1201-1213 correspond to steps 501-513 respectively and are not further described. The process is performed TU by TU.

Next to steps 1206 and 1207, flag cu_residual_act_flag (retrieved at CU level) is compared to 0 at step 1214. This is to know whether or not ARCT is applied to the current residue. Note that in slight variants depending on the inventive improvement described above with reference to FIGS. 9-11, flags inter_RCT_flag, ibc_RCT_flag and intra_RCT_flag may be examined to determine whether or not the current residue is subject to RCT.

When flag cu_residual_act_flag (or the like) is set equal to 1, the explicit RDCPM flag and the related syntax are not decoded, meaning that RDPCM is not applied to the current residue.

In an additional embodiment when flag cu_residual_act_flag is set equal to 1, the implicit RDPCM is not applied by both the encoder and the decoder. This mostly concerns the INTRA coding modes for which it may be decided to automatically perform RDPCM (i.e. implicit RDPCM as soon as the current Coding Unit is INTRA-coded). In such a situation, RCT and RDPCM are mutually exclusive one the other.

So, the RDPCM method is not cascaded to the residual colour transform method.

This is because the inventors have noticed that the combination of these two methods is not efficient. As a consequence, the loss in coding efficiency is relatively small compared to the high reduction in processing complexity. In particular, avoiding the combination as proposed reduces the encoding time by avoiding tested combinations of the two methods. Moreover, it reduces the decoding process by limiting the processing to one or the other method.

Figure 13:
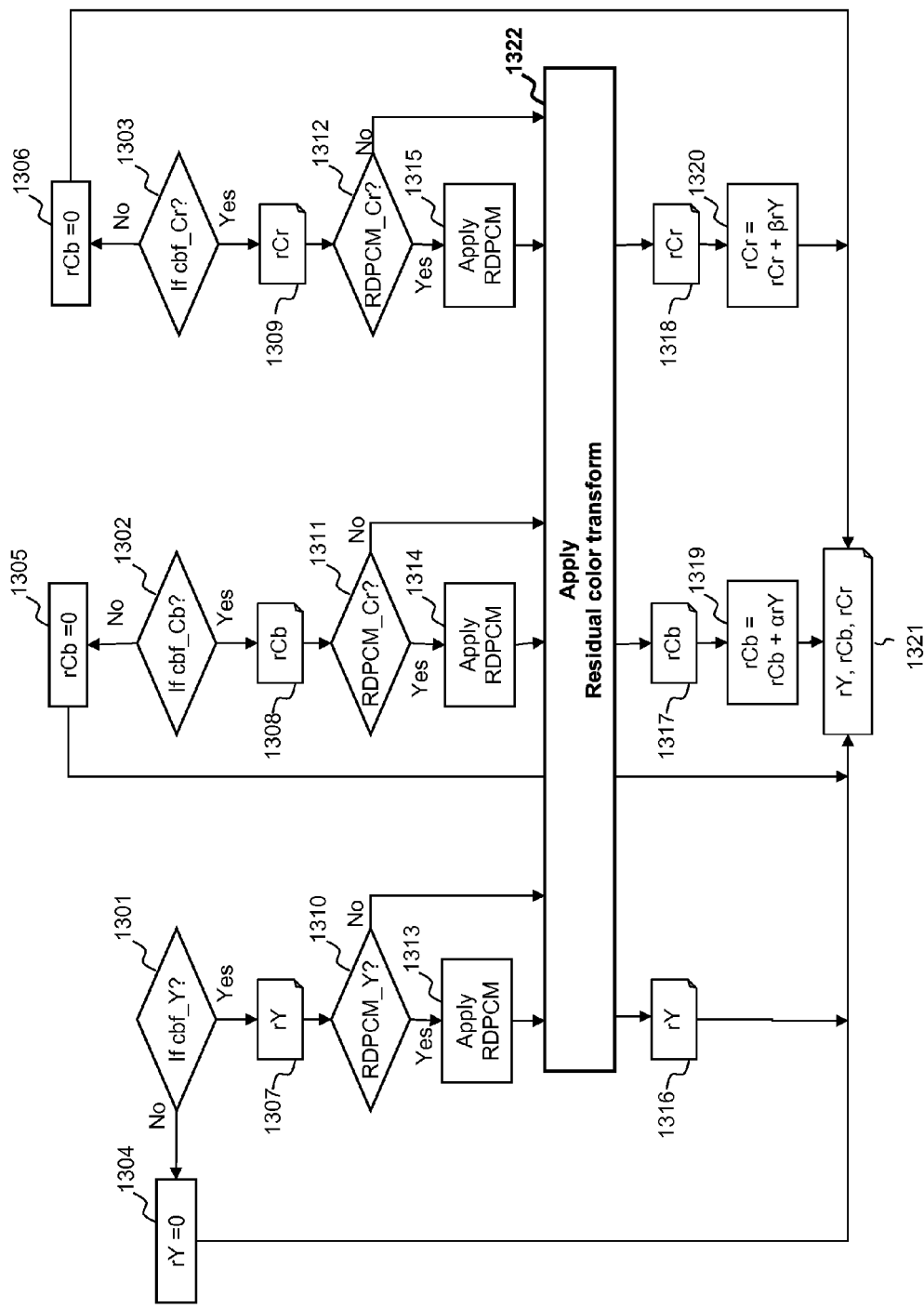
FIG. 13 illustrates an exemplary decoding process for a Transform Unit when ARCT is applied prior to the cross-component prediction.

The improvement of FIG. 13 relates to RCT and cross-component prediction, and provides applying the residual colour transform prior to applying the cross-component prediction at decoder or after applying the cross-component prediction at encoder.

FIG. 13 illustrates an exemplary decoding process for a Transform Unit implementing this improvement. The Figure is based on FIG. 6 previously described: steps 1301-1321 correspond to steps 601-621 respectively and are not further described.

In this example, the residual colour transform (RCT) is applied at TU level.

Next to steps 1310-1315 (RDPCM is applied or not), the residual colour transform is applied at step 1322 depending on flag cu_residual_act_flag corresponding to the current TU or CU. Next to step 1322, the cross-component prediction is applied at step 1319 or 1320 as described above.

The signalling of the use of the residual colour transform can be, in that case, performed at TU level. This simplifies the design by using the residual colour transform and the cross-component prediction at the same level. Moreover, it offers an additional granularity for the use of the residual colour transform by selecting it at a lower level than the CU level.

In a specific embodiment, an option to apply the residual colour transform before or after the cross-component prediction is proposed. In such a case, preference is given to signal it at CU level with flag cu_residual_act_flag. This flag may take three values, for example, 0 means no RCT is applied, 1 means that RCT is applied (by the decoder) after the cross-component prediction, 2 means that RCT is applied (by the decoder) before the cross-component prediction.

Another improvement of HEVC is now proposed, at the encoder. According to this improvement, the encoder decision to select the residual colour transform (RCT) for a current residue takes into account the best current mode, in order to run or not the second evaluation loop of the residual.

Figure 15:
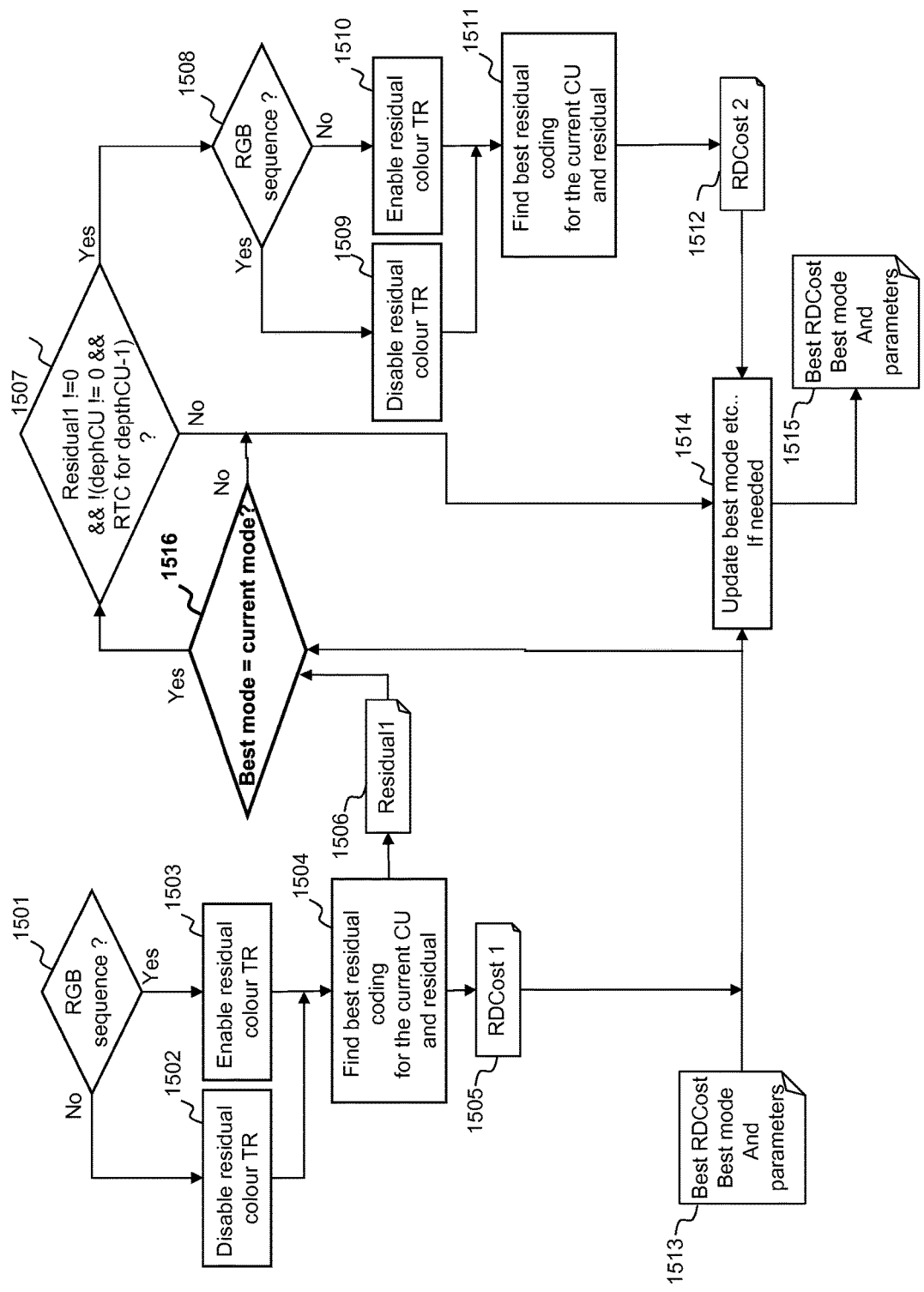
FIG. 15 illustrates an improved embodiment of the encoder selection of ARCT.

This improvement is illustrated through FIG. 15 which is based on FIG. 8 previously described: steps 1501-1515 correspond to steps 801-815 respectively and are not further described.

At the end of the first evaluation loop (i.e. after the first encoding of the residual for the current mode at step 1504), the encoder checks whether or not the currently-tested mode is the current best mode. This is new step 1516.

If it is not the case, the second residual evaluation loop is performed if the condition 1507 (described above for 807) is met. Otherwise, step 1514 is directly performed.

In one embodiment, new step 1516 is provided for all or part of Inter mode, Merge mode and IBC mode.

In one embodiment, when the Merge mode is the mode currently tested, the encoder also checks whether or not the best mode is the Merge mode and has no residual. This is to avoid testing the second residual evaluation loop if there is no residual.

In another embodiment, when the Inter mode is the mode currently tested, the encoder also checks whether or not the best mode is the Skip mode. This is also to avoid testing the second residual evaluation loop if there is no residual (Skip mode).

Note that, in this embodiment, RDCost1 can be taken into account to update the best mode and the best RDCost of step 1513 before checking the condition 1516.

In another embodiment, the second residual evaluation loop is disabled. This can be applied for some specific testing modes. For example, the second evaluation loop is disabled for the evaluation of a list of block vectors for IBC mode.

Figure 14:
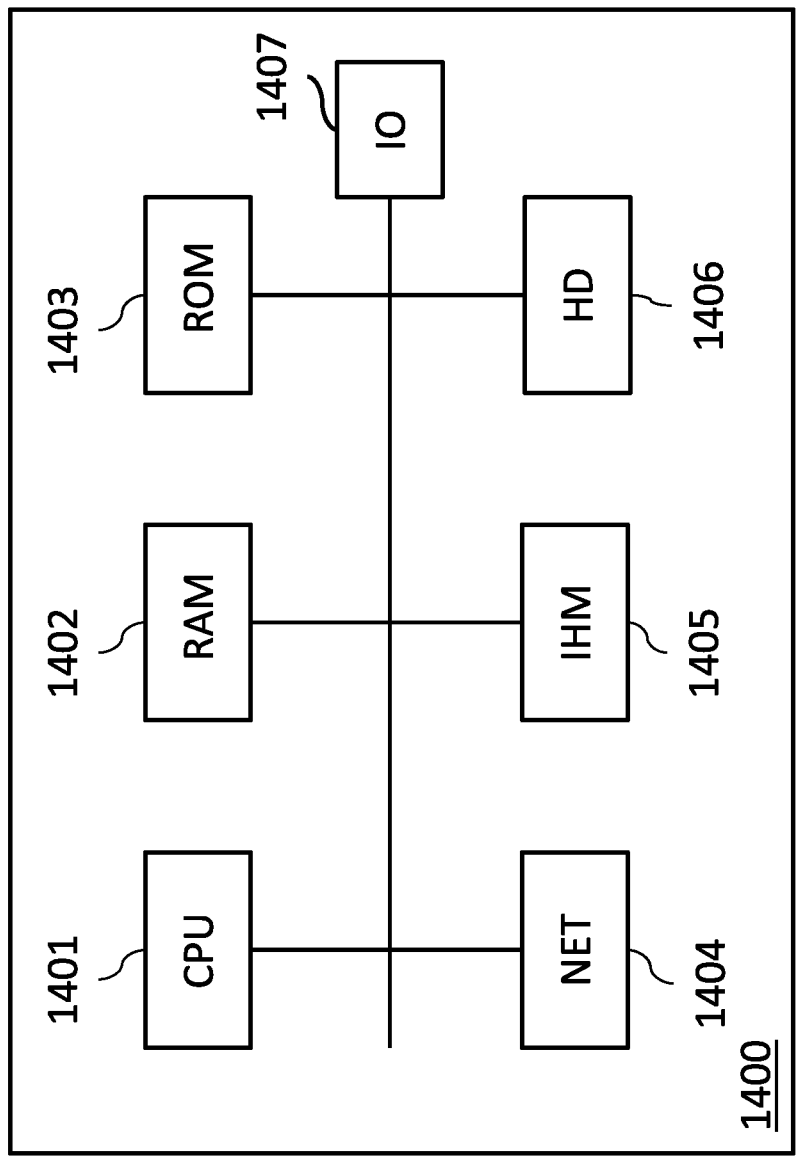
FIG. 14 is a schematic block diagram of a computing device for implementation of one or more embodiments of the invention.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus connected to:

- a central processing unit 1401, such as a microprocessor, denoted CPU;
- a random access memory 1402, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 1403, denoted ROM, for storing computer programs for implementing embodiments of the invention;
- a network interface 1404 is typically connected to a communication network over which digital data to be processed are transmitted or received. The network interface 1404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1401;
- a user interface 1405 may be used for receiving inputs from a user or to display information to a user;
- a hard disk 1406 denoted HD may be provided as a mass storage device;

an I/O module 1407 may be used for receiving/sending data from/to external devices such as a video source or display.

The executable code may be stored either in read only memory 1403, on the hard disk 1406 or on a removable digital medium such as for example a disk. According to a variant, the executable code of the programs can be received by means of a communication network, via the network interface 1404, in order to be stored in one of the storage means of the communication device 1400, such as the hard disk 1406, before being executed.

The central processing unit 1401 is adapted to control and direct the execution of the instructions or portions of software code of the program or programs according to embodiments of the invention, which instructions are stored in one of the aforementioned storage means. After powering on, the CPU 1401 is capable of executing instructions from main RAM memory 1402 relating to a software application after those instructions have been loaded from the program ROM 1403 or the hard-disc (HD) 1406 for example. Such a software application, when executed by the CPU 1401, causes the steps of the flowcharts shown in FIGS. 9 to 13 and 15 to be performed.

Any step of the algorithms shown in these Figures may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of coding an image formed of a plurality of coding units of pixels in a video sequence, a coding unit being the basic unit for which a prediction mode is selected, the method comprising:
    obtaining a residual block of pixels for at least part of a current coding unit using a predictor block of pixels;
    determining whether to apply or not a residual colour transform to the obtained residual block of pixels before encoding it into a bitstream, the residual colour transform converting colour pixel components of the residual block from a colour space to another colour space;
    signalling the result of the determining using a residual colour transform, RCT, flag in the bitstream;
    wherein determining whether to apply or not the residual colour transform comprises taking into account a best current coding mode in deciding whether to perform an evaluation of the residual colour transform or not for the obtained residual block of pixels;
    performing a first evaluation loop including enabling or disabling the residual colour transform for the first evaluation loop dependent on a colour type of the image and coding the residual block of pixels using the residual colour transform if enabled, to obtain a first rate-distortion cost,
    evaluating whether or not the obtained first rate-distortion cost is lower than a reference best rate-distortion cost;
    performing a second evaluation loop only in case of positive evaluation, the second evaluation loop including enabling or disabling the residual colour transform for the second evaluation loop depending on a colour type of the image and coding the residual block of pixels using the residual colour transform if enabled, to obtain a second rate-distortion cost; and
    comparing the obtained rate-distortion cost or costs to the reference best rate-distortion cost to determine a best coding mode for coding the residual block of pixels.

2. The method of claim 1, wherein the residual colour transform, RCT, flag is signalled in the bitstream at a transform unit level made of transform units, at least one coding unit comprising one or more transform units.

3. The method of claim 1, wherein the first and second evaluation loops code the residual block of pixels using the same coding parameters and an inverse enablement of the residual colour transform.

4. The method of claim 1, wherein the colour type of the image is a colour space in which the image is defined.

5. The method of claim 1, wherein the evaluation is negative when the reference best rate-distortion cost is associated with a reference coding mode having no residual block of pixels for the same part of the current coding unit.

6. A non-transitory computer-readable medium storing a program which, when executed by a microprocessor or computer system in a device, causes the device to perform the method of claim 1.

7. An encoding device for coding an image formed of a plurality of coding units of pixels in a video sequence, a coding unit being the basic unit for which a prediction mode is selected, the encoding device comprising at least one microprocessor configured for carrying out the steps of:
    obtaining a residual block of pixels for at least part of a current coding unit using a predictor block of pixels;
    determining whether to apply or not a residual colour transform to the obtained residual block of pixels before encoding it into a bitstream, the residual colour transform converting colour pixel components of the residual block from a colour space to another colour space;
    signalling the result of the determining using a residual colour transform, RCT, flag in the bitstream;
    wherein determining whether to apply or not the residual colour transform comprises taking into account a best current coding mode in deciding whether to perform an evaluation of the residual colour transform or not for the obtained residual block of pixels;
    performing a first evaluation loop including enabling or disabling the residual colour transform for the first evaluation loop depending on a colour type of the image and coding the residual block of pixels using the residual colour transform if enabled, to obtain a first rate-distortion cost;
    evaluating whether or not the obtained first rate-distortion cost is lower than a reference best rate-distortion cost;

performing a second evaluation loop only in case of positive evaluation, the second evaluation loop including enabling or disabling the residual colour transform for the second evaluation loop depending on a colour type of the image and coding the residual block of pixels using the residual colour transform if enabled, to obtain a second rate-distortion cost; and comparing the obtained rate-distortion cost or costs to the reference best rate-distortion cost to determine a best coding mode for coding the residual block of pixels.

8. The encoding device of claim 7, wherein the residual colour transform, RCT, flag is signalled in the bitstream at a transform unit level made of transform units, at least one coding unit comprising one or more transform units.

9. The encoding device of claim 7, wherein the first and second evaluation loops code the residual block of pixels using the same coding parameters and an inverse enablement of the residual colour transform.

10. The encoding device of claim 7, wherein the colour type of the image is a colour space in which the image is defined.

11. The encoding device of claim 7, wherein the evaluation is negative when the reference best rate-distortion cost is associated with a reference coding mode having no residual block of pixels for the same part of the current coding unit.

* * * * *